United States Patent
Okuda et al.

(10) Patent No.: US 9,976,001 B2
(45) Date of Patent: May 22, 2018

(54) PROCESS FOR PRODUCING WATER-ABSORBING RESIN POWDER

(75) Inventors: Sumio Okuda, Himeji (JP); Kunihiko Ishizaki, Himeji (JP); Katsuyuki Wada, Himeji (JP)

(73) Assignee: Nippon Shokubai Co., Ltd., Osaka-shi, Osaka (JP)

(*) Notice: Subject to any disclaimer, the term of this patent is extended or adjusted under 35 U.S.C. 154(b) by 0 days. days.

(21) Appl. No.: 13/578,118

(22) PCT Filed: Feb. 10, 2011

(86) PCT No.: PCT/JP2011/052945
§ 371 (c)(1),
(2), (4) Date: Aug. 9, 2012

(87) PCT Pub. No.: WO2011/099586
PCT Pub. Date: Aug. 18, 2011

(65) Prior Publication Data
US 2012/0298915 A1    Nov. 29, 2012

(30) Foreign Application Priority Data
Feb. 10, 2010    (JP) ............... 2010-027202

(51) Int. Cl.
C08J 3/00    (2006.01)
C08L 33/02    (2006.01)
C08J 3/12    (2006.01)
C08J 3/24    (2006.01)
B01J 20/26    (2006.01)

(52) U.S. Cl.
CPC ............ C08J 3/12 (2013.01); B01J 20/267 (2013.01); C08J 3/245 (2013.01); B01J 2220/68 (2013.01); C08J 2300/14 (2013.01)

(58) Field of Classification Search
CPC ............... C08F 8/00; C08F 6/00; C08J 3/00
USPC ... 525/54.24, 54.26, 63, 800, 802, 804, 812; 521/53, 55, 57, 905; 428/403, 407
See application file for complete search history.

(56) References Cited

U.S. PATENT DOCUMENTS

| | | |
|---|---|---|
| 4,734,478 A | 3/1988 | Tsubakimoto et al. |
| 4,755,562 A | 7/1988 | Alexander et al. |
| 4,783,510 A | 11/1988 | Saotome |
| 4,824,901 A | 4/1989 | Alexander et al. |
| 4,893,999 A | 1/1990 | Chmelir et al. |
| 4,920,202 A | 4/1990 | Irie et al. |
| 5,005,771 A | 4/1991 | Pieh et al. |
| 5,140,076 A | 8/1992 | Hatsuda et al. |
| 5,206,205 A | 4/1993 | Tsai |
| 5,229,487 A | 7/1993 | Tsubakimoto et al. |
| 5,385,983 A | 1/1995 | Graham |
| 5,409,771 A | 4/1995 | Dahmen et al. |
| 5,422,405 A | 6/1995 | Dairoku et al. |
| 5,462,972 A | 10/1995 | Smith et al. |
| 5,597,873 A | 1/1997 | Chambers et al. |
| 5,610,208 A | 3/1997 | Dairoku et al. |
| 5,610,220 A | 3/1997 | Klimmek et al. |
| 5,633,316 A | 5/1997 | Gartner et al. |
| 5,669,894 A | 9/1997 | Goldman et al. |
| 5,672,633 A | 9/1997 | Brehm et al. |
| 5,674,633 A | 10/1997 | Saunders et al. |
| 5,945,495 A | 8/1999 | Daniel et al. |
| 5,981,070 A * | 11/1999 | Ishizaki et al. ............ 428/407 |
| 6,071,976 A | 6/2000 | Dairoku et al. |
| 6,164,455 A | 12/2000 | Kakita et al. |
| 6,187,902 B1 | 2/2001 | Yanase et al. |
| 6,207,796 B1 | 3/2001 | Dairoku et al. |
| 6,228,930 B1 | 5/2001 | Dairoku et al. |
| 6,239,230 B1 | 5/2001 | Eckert et al. |
| 6,241,928 B1 | 6/2001 | Hatsuda et al. |
| 6,254,990 B1 | 7/2001 | Ishizaki et al. |

(Continued)

FOREIGN PATENT DOCUMENTS

| | | |
|---|---|---|
| EP | 0349240 | 1/1990 |
| EP | 0450923 | 10/1991 |

(Continued)

OTHER PUBLICATIONS

English translation of International Preliminary Report on Patentability issued in PCT/JP2011/052945, dated Mar. 8, 2011.
English translation of International Search Report for PCT/JP2011/052945, dated Mar. 8, 2011.
Office Action dated Feb. 13, 2013 in U.S. Appl. No. 13/634,128.
Notice of Reasons for Rejection, dated Nov. 26, 2013, for JP 2011-553903, and English translation thereof.
Notice of Reasons for Rejection, dated Nov. 26, 2013, for JP 2012-504554, and English translation thereof.
Notice of Reasons for Rejection, dated Nov. 26, 2013, for JP 2012-504555, and English translation thereof.
Notice of Reasons for Rejection, dated Nov. 26, 2013, for JP 2012-504556, and English translation thereof.
Office Action dated Sep. 24, 2013 in U.S. Appl. No. 13/634,128.
Notice of Reasons for Rejection dated Feb. 25, 2014 in JP Application No. 2012-504555, and English translation thereof.

(Continued)

Primary Examiner — Vasu Jagannathan
Assistant Examiner — Preeti Kumar
(74) Attorney, Agent, or Firm — Dickinson Wright, PLLC

(57) ABSTRACT

Provided is a process for producing a water-absorbing resin powder which contains a given amount of water added thereto, has a low dust content, and has high material properties. When a water-absorbing resin powder which has undergone surface crosslinking is produced on an industrial scale, various problems concerning production are eliminated and a long-term stable operation is possible without causing a deterioration in the material properties of the resin. Even when the process is continued over a long period, the material properties are stabilized (decrease in standard deviation) or improved (improvement in AAP). The process for producing a water-absorbing resin comprises, in the following order, a first classification step for classifying a water-absorbing resin, a surface crosslinking step after the classification, a water addition step for adding water to the water-absorbing resin powder after or during the surface crosslinking, a second classification step, and a conveying step.

20 Claims, 1 Drawing Sheet

(56) References Cited

U.S. PATENT DOCUMENTS

| | | |
|---|---|---|
| 6,265,488 B1 | 7/2001 | Fujino et al. |
| 6,291,635 B1 | 9/2001 | Maeda et al. |
| 6,297,139 B1 | 10/2001 | Lin |
| 6,300,423 B1 | 10/2001 | Engelhardt et al. |
| 6,372,852 B2 | 4/2002 | Hitomi et al. |
| 6,388,000 B1 | 5/2002 | Irie et al. |
| 6,458,921 B1 | 10/2002 | Dairoku et al. |
| 6,472,478 B1 | 10/2002 | Funk et al. |
| 6,503,979 B1 | 1/2003 | Funk et al. |
| 6,514,615 B1 | 2/2003 | Sun et al. |
| 6,559,239 B1 | 5/2003 | Riegel et al. |
| 6,605,673 B1 | 8/2003 | Mertens et al. |
| 6,620,889 B1 | 9/2003 | Mertens et al. |
| 6,620,899 B1 | 9/2003 | Morken et al. |
| 6,641,064 B1 | 11/2003 | Dentler et al. |
| 6,657,015 B1 | 12/2003 | Riegel et al. |
| 6,710,141 B1 | 3/2004 | Heide et al. |
| 6,716,894 B2 | 4/2004 | Kajikawa et al. |
| 6,720,389 B2 | 4/2004 | Hatsuda et al. |
| 6,727,345 B2 * | 4/2004 | Kajikawa ............. B29B 9/12 528/480 |
| 6,809,158 B2 | 10/2004 | Ikeuchi et al. |
| 6,817,557 B2 | 11/2004 | Kakita et al. |
| 6,906,159 B2 | 6/2005 | Dairoku et al. |
| 6,987,151 B2 | 1/2006 | Gartner et al. |
| 7,091,253 B2 | 8/2006 | Dairoku et al. |
| 7,098,284 B2 | 8/2006 | Torii et al. |
| 7,157,141 B2 | 1/2007 | Inger et al. |
| 7,183,456 B2 | 2/2007 | Hatsuda et al. |
| 7,193,006 B2 | 3/2007 | Ishizaki et al. |
| 7,312,278 B2 | 12/2007 | Nakashima et al. |
| 7,378,453 B2 | 5/2008 | Nogi et al. |
| 7,473,739 B2 | 1/2009 | Dairoku et al. |
| 7,682,702 B2 | 3/2010 | Nitschke |
| 7,960,490 B2 | 6/2011 | Funk et al. |
| 7,967,148 B2 | 6/2011 | Stueven et al. |
| 8,071,202 B2 | 12/2011 | Furno et al. |
| 8,104,621 B2 | 1/2012 | Weismantel et al. |
| 8,138,292 B2 | 3/2012 | Matsumoto et al. |
| 8,148,485 B2 * | 4/2012 | Nogi ............. B65B 1/08 526/223 |
| 8,188,163 B2 | 5/2012 | Matsumoto et al. |
| 8,544,507 B2 * | 10/2013 | Matsumoto ............. B65B 1/08 141/10 |
| 2003/0020199 A1 | 1/2003 | Kajikawa et al. |
| 2003/0087983 A1 | 5/2003 | Kajikawa et al. |
| 2004/0110006 A1 | 6/2004 | Ishizaki et al. |
| 2004/0240316 A1 | 12/2004 | Nogi et al. |
| 2005/0029352 A1 | 2/2005 | Spears |
| 2005/0048221 A1 | 3/2005 | Irie et al. |
| 2005/0070671 A1 | 3/2005 | Torii et al. |
| 2005/0215734 A1 | 9/2005 | Dairoku et al. |
| 2005/0288182 A1 | 12/2005 | Torii et al. |
| 2006/0057389 A1 | 3/2006 | Reimann et al. |
| 2006/0073969 A1 | 4/2006 | Torii et al. |
| 2006/0204755 A1 | 9/2006 | Torii et al. |
| 2006/0247351 A1 | 11/2006 | Torii et al. |
| 2007/0041796 A1 | 2/2007 | Irie et al. |
| 2007/0078231 A1 | 4/2007 | Shibata et al. |
| 2007/0106013 A1 | 5/2007 | Adachi et al. |
| 2007/0123624 A1 | 5/2007 | Otten et al. |
| 2007/0141338 A1 | 6/2007 | Ishizaki et al. |
| 2007/0149691 A1 | 6/2007 | Ishizaki et al. |
| 2007/0149760 A1 * | 6/2007 | Kadonaga et al. ............. 528/480 |
| 2007/0161759 A1 | 7/2007 | Riegel et al. |
| 2007/0173610 A1 | 7/2007 | Wada et al. |
| 2007/0293632 A1 * | 12/2007 | Riegel et al. ............. 525/329.9 |
| 2008/0004408 A1 | 1/2008 | Stueven et al. |
| 2008/0021150 A1 | 1/2008 | Becker et al. |
| 2008/0202987 A1 | 8/2008 | Weismantel et al. |
| 2008/0214749 A1 | 9/2008 | Weismantel et al. |
| 2008/0221277 A1 | 9/2008 | Walden et al. |
| 2008/0280128 A1 | 11/2008 | Furno et al. |
| 2008/0287631 A1 | 11/2008 | Nitschke |
| 2009/0022603 A1 | 1/2009 | Feise et al. |
| 2009/0060660 A1 | 3/2009 | Funk et al. |
| 2009/0105389 A1 | 4/2009 | Walden et al. |
| 2009/0194462 A1 | 8/2009 | Stueven et al. |
| 2009/0202805 A1 | 8/2009 | Furno et al. |
| 2009/0227741 A1 | 9/2009 | Walden et al. |
| 2009/0266747 A1 | 10/2009 | Stueven et al. |
| 2009/0275470 A1 | 11/2009 | Nagasawa et al. |
| 2009/0314258 A1 | 12/2009 | Azou |
| 2009/0321682 A1 | 12/2009 | Kajikawa et al. |
| 2010/0001233 A1 | 1/2010 | Funk et al. |
| 2010/0016522 A1 | 1/2010 | Stueven et al. |
| 2010/0140546 A1 | 6/2010 | Barthel et al. |
| 2010/0206897 A1 * | 8/2010 | Herfert et al. ............. 222/1 |
| 2010/0249320 A1 | 9/2010 | Matsumoto et al. |
| 2011/0003926 A1 | 1/2011 | Nogi et al. |
| 2011/0006140 A1 | 1/2011 | Ishizaki et al. |
| 2011/0009590 A1 | 1/2011 | Matsumoto et al. |
| 2011/0011491 A1 | 1/2011 | Matsumoto et al. |
| 2011/0015351 A1 | 1/2011 | Nogi et al. |
| 2011/0021725 A1 | 1/2011 | Takaai et al. |
| 2011/0028670 A1 | 2/2011 | Matsumoto et al. |
| 2011/0039961 A1 | 2/2011 | Matsumoto et al. |
| 2011/0059329 A1 | 3/2011 | Dobrawa et al. |
| 2011/0088806 A1 | 4/2011 | Nogi et al. |
| 2011/0110730 A1 | 5/2011 | Nogi et al. |
| 2011/0166300 A1 | 7/2011 | Dairoku et al. |
| 2012/0157625 A1 | 6/2012 | Kitano et al. |
| 2012/0157635 A1 | 6/2012 | Nogi et al. |
| 2012/0157650 A1 | 6/2012 | Nogi et al. |
| 2012/0172536 A1 | 7/2012 | Nogi et al. |
| 2012/0220733 A1 | 8/2012 | Machida et al. |
| 2012/0220745 A1 | 8/2012 | Machida et al. |
| 2013/0281594 A1 | 10/2013 | Dobrawa et al. |
| 2014/0058346 A1 | 2/2014 | Wada et al. |

FOREIGN PATENT DOCUMENTS

| | | | |
|---|---|---|---|
| EP | 0450924 | 10/1991 | |
| EP | 0534228 | 3/1993 | |
| EP | 0603292 | 6/1994 | |
| EP | 0605150 | 7/1994 | |
| EP | 0668080 | 8/1995 | |
| EP | 0812873 | 12/1997 | |
| EP | 1422257 | 5/2004 | |
| EP | 1426402 | 6/2004 | |
| EP | 1824910 | 8/2007 | |
| EP | 1848758 | 10/2007 | |
| EP | 1949011 | 7/2008 | |
| EP | 2057228 | 5/2009 | |
| EP | 2189478 | 5/2010 | |
| EP | 2253375 | 11/2010 | |
| EP | 2258749 | 12/2010 | |
| EP | 2261148 | 12/2010 | |
| EP | 2471843 | 7/2012 | |
| EP | 2479195 | 7/2012 | |
| JP | 54-053165 | 4/1979 | |
| JP | 64-060683 | 3/1989 | |
| JP | 1060683 | 3/1989 | |
| JP | 7-224304 | 8/1995 | |
| JP | 7-242709 | 9/1995 | |
| JP | 7-270070 | 10/1995 | |
| JP | 8-073518 | 3/1996 | |
| JP | 2000-063527 | 2/2000 | |
| JP | 2001-018222 | 1/2001 | |
| JP | 2004-197087 | 7/2004 | |
| JP | 2004-345804 | 12/2004 | |
| JP | 2004-352941 | 12/2004 | |
| JP | 2006-198529 | 8/2006 | |
| JP | WO 2009113671 A1 * | 9/2009 | ............. B65B 1/08 |
| JP | WO 2009113672 A1 * | 9/2009 | ............. B65B 1/08 |
| JP | 2009-256687 | 11/2009 | |
| JP | 2009-545635 | 12/2009 | |
| JP | 2010-053296 | 3/2010 | |
| WO | 99/42494 | 8/1999 | |
| WO | 99/42496 | 8/1999 | |
| WO | 99/43720 | 9/1999 | |
| WO | 2004/069293 | 8/2004 | |
| WO | 2004/069915 | 8/2004 | |
| WO | 2009/123193 | 8/2004 | |

(56) References Cited

FOREIGN PATENT DOCUMENTS

| | | |
|---|---|---|
| WO | 2005/016393 | 2/2005 |
| WO | 2005/056177 | 6/2005 |
| WO | 2006/034806 | 4/2006 |
| WO | 2006/074816 | 7/2006 |
| WO | 2006/082188 | 8/2006 |
| WO | 2006/082189 | 8/2006 |
| WO | 2006/082197 | 8/2006 |
| WO | 2006/111402 | 10/2006 |
| WO | 2006/111403 | 10/2006 |
| WO | 2006/111404 | 10/2006 |
| WO | 2007/065840 | 6/2007 |
| WO | 2007/104673 | 9/2007 |
| WO | 2007/104676 | 9/2007 |
| WO | 2007/121037 | 10/2007 |
| WO | 2008/003672 | 1/2008 |
| WO | 2008/009642 | 1/2008 |
| WO | 2008/009842 | 1/2008 |
| WO | 2008/009843 | 1/2008 |
| WO | 2008/015946 | 2/2008 |
| WO | 2008/003675 | 4/2008 |
| WO | 2008/037673 | 4/2008 |
| WO | 2008/037675 | 4/2008 |
| WO | 2008/037676 | 4/2008 |
| WO | 2008/087114 | 7/2008 |
| WO | 2008/123477 | 10/2008 |
| WO | 2009/005114 | 1/2009 |
| WO | 2009/028568 | 3/2009 |
| WO | 2009/113671 | 9/2009 |
| WO | 2009/113678 | 9/2009 |
| WO | 2009/113679 | 9/2009 |
| WO | 2009/119754 | 9/2009 |
| WO | 2009/119756 | 10/2009 |
| WO | 2009/123197 | 10/2009 |
| WO | 2010/032694 | 3/2010 |
| WO | 2011/026876 | 3/2011 |

OTHER PUBLICATIONS

Advisory Action dated Feb. 7, 2014 in U.S. Appl. No. 13/634,128.
Office Action dated Jun. 27, 2014 issued in U.S. Appl. No. 13/634,128.
Office Action dated Jul. 7, 2014 issued in U.S. Appl. No. 13/634,151.
Extended European Search Report, dated Nov. 5, 2014, for EP Application No. 11742329.3.
Extended European Search Report, dated Oct. 21, 2014, for EP Application No. 11753511.2.
Extended European Search Report, dated Oct. 23, 2014, for EP Application No. 11753510.4.
Extended European Search Report, dated Oct. 17, 2014, for EP Application No. 11753512.0.
Chong, Z. et al., Model-Based Control of Multi-Unit Systems under Partial Shutdown Conditions, 2009 American Control Conference, Hyatt Regency Riverfront, St. Louis, MO, Jun. 2009.
Office Action dated Aug. 12, 2014 issued in related U.S. Appl. No. 13/634,167.
Notice of Reasons for Rejection dated Apr. 1, 2014 in JP Application No. 2012-504556, and English translation thereof.
Notice of Reasons for Rejection dated Apr. 1, 2014 in JP Application No. 2011-553903, and English translation thereof.
U.S. Office Action dated Sep. 28, 2015, issued for counterpart U.S. Appl. No. 13/634,128.
European Office Action dated Nov. 11, 2015, issued for counterpart Patent Application No. 11753512.0.
Advisory Action, dated Mar. 4, 2015, issued in related U.S. Appl. No. 13/634,151.
Final Office Action dated Apr. 2, 2015 issued in related U.S. Appl. No. 13/634,128.
Office Action dated Apr. 17, 2015 issued in related U.S. Appl. No. 13/634,151.
Advisory Action, dated May 1, 2015, issued in related U.S. Appl. No. 13/634,167.
Communication Pursuant to Rule 114(2) EPC, Observations by a Third Party Concerning the Patentability of the Invention, dated Oct. 8, 2015, 126 pages.
U.S. Examiner's Answer dated Jul. 27, 2016, issued in U.S. Appl. No. 13/634,128.
European Office Action dated Sep. 28, 2016, issued in the counterpart Patent Application No. 11742329.3.
U.S. Decision on Appeal dated Jul. 25, 2017 which issued in the counterpart U.S. Appl. No. 13/634,128.
Office Action dated Nov. 21, 2014 issued in related U.S. Appl. No. 13/634,151.
Office Action dated Dec. 23, 2014 issued in related U.S. Appl. No. 13/634,167.
U.S. Non-Final Office Action dated Nov. 8, 2017 which issued in the counterpart U.S. Appl. No. 13/634,128.

\* cited by examiner

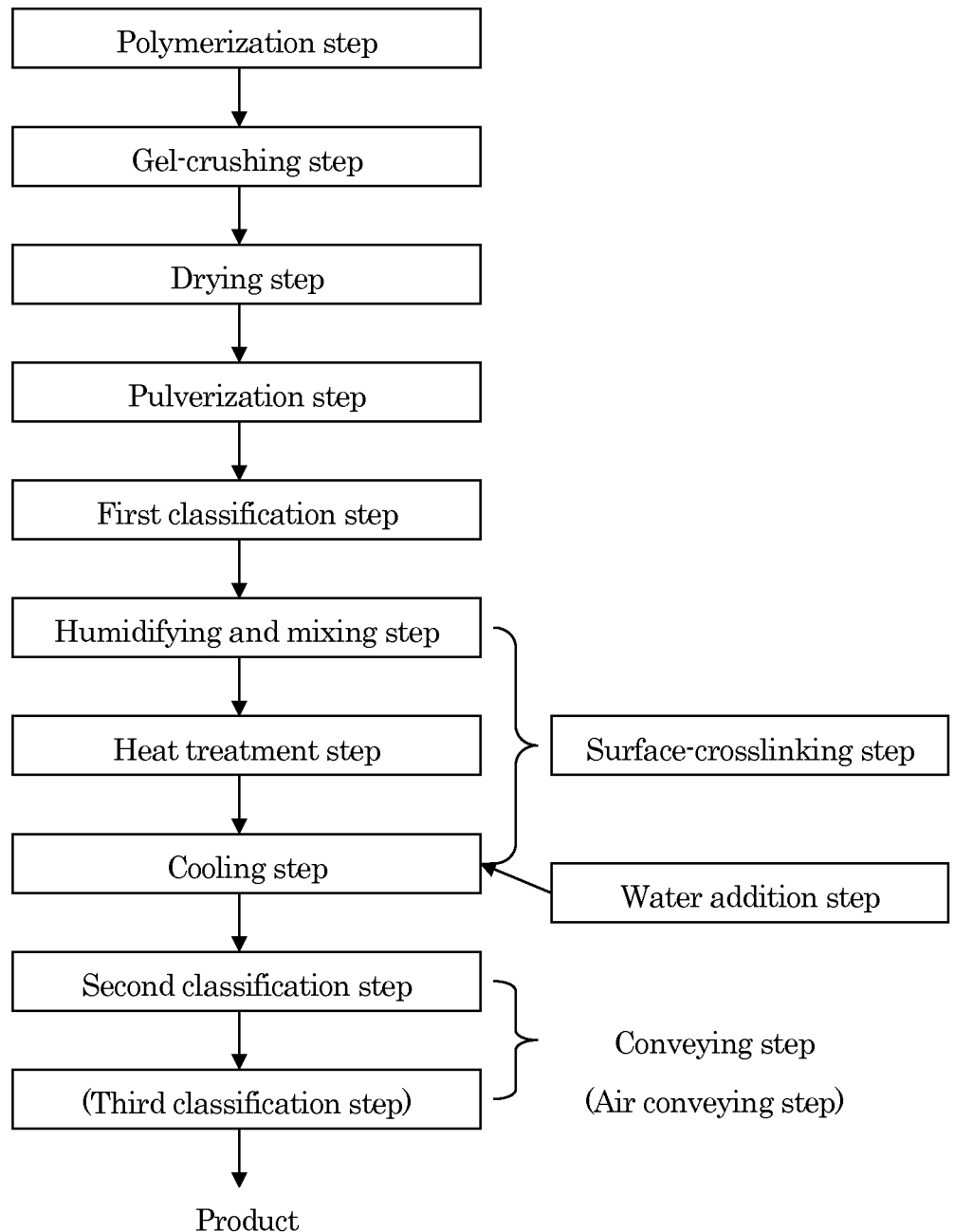

PROCESS FOR PRODUCING WATER-ABSORBING RESIN POWDER

TECHNICAL FIELD

The present invention relates to a process for producing water-absorbing resin powder. More particularly, the present invention relates to a process for producing a water-absorbing resin powder to which a given amount of water is added or which contains a given amount of water, has a low dust content, and has high physical properties. When a water-absorbing resin powder which has undergone surface-crosslinking is produced on an industrial scale, various problems concerning production are eliminated and a long-term stable operation is possible without causing a deterioration in the physical properties of the water-absorbing resin and the physical properties are stabilized (decrease in standard deviation) and/or improved (improvement in AAP).

BACKGROUND ART

A water-absorbing resin (Super Absorbent Polymer; abbreviated as SAP) has been used in a wide range of uses for sanitary materials such as paper diapers, sanitary napkins, incontinence products for adults, and the like, and uses for water retention agent for soil, owing to properties that the resin can absorb a large quantity of a water-based liquid several times to several hundred times as much as the mass of itself and has been manufactured and consumed in large quantities.

In general, a water-absorbing resin is produced by polymerizing an aqueous solution containing a hydrophilic monomer and an internal crosslinking agent to obtain a water-containing gel-like crosslinked polymer, drying the gel polymer, and surface-crosslinking the dried product. The physical properties such as water absorption against pressure (AAP) and liquid permeability (SFC, GBP) of the above-mentioned water-absorbing resin are improved by surface-crosslinking step. The surface-crosslinking step is commonly a step of providing a highly crosslinked layer in the vicinity of the water-absorbing resin surface by causing reaction of the water-absorbing resin with a surface-crosslinking agent or a polymerizable monomer.

Various kinds of surface-crosslinking agents reactive on a functional group of a water-absorbing resin (particularly, carboxyl group) are proposed as a surface-reforming method of such a water-absorbing resin above. And examples known as the surface-crosslinking agents are oxazoline compounds (Patent Document 1), vinyl ether compounds (Patent Document 2), epoxy compounds (Patent Document 3), oxetane compounds (Patent Document 4), polyhydric alcohol compounds (Patent Document 5), polyamide polyamine-epihalo adducts (Patent Documents 6, 7), hydroxyacrylamide compounds (Patent Document 8), oxazolidinone compounds (Patent Documents 9, 10), bis- or poly-oxazoline compounds (Patent Document 11), 2-oxotetrahydro-1,3-oxazolidine compounds (Patent Document 12), alkylene carbonate compounds (Patent Document 13), and the like. A technique using a specified surface-crosslinking agent (Patent Document 14) is also known.

Techniques also known as the surface-reforming method other than the method carried out by a surface-crosslinking agent are a technique of surface-crosslinking by polymerizing a monomer (Patent Document 15) and techniques of radical crosslinking with persulfate etc. (Patent Documents 16, 17). Techniques of reforming water-absorbing resins by heating without using a surface-crosslinking agent (Patent Documents 18, 19), which is different from common surface-crosslinking treatment, are also known.

A technique of using an additive in combination for mixing a surface-crosslinking agent is also proposed and examples known as the additive are water-soluble cations such as aluminum salts (Patent Documents 20, 21), alkali (Patent Document 22), organic acids or inorganic acids (Patent Document 23), peroxides (Patent Document 24), and surfactants (Patent Document 25) and the like.

Not only the chemical methods improvement but also many surface treatment methods improvement using apparatuses and reaction conditions have been proposed. Examples known as a improved method using an apparatus are techniques using a specified mixing apparatus as a mixing apparatus for a surface-crosslinking agent (Patent Documents 26 to 29) and techniques using a specified heating apparatus for causing reaction of a water-absorbing resin and a surface-crosslinking agent (Patent Documents 30, 31) and the like.

There is also a technique for controlling an increase in heating temperature for causing reaction of a water-absorbing resin and a surface-crosslinking agent (Patent Document 32) in improvement of the reaction condition aspect. In a heating step, techniques known are a technique of carrying out surface-crosslinking twice (Patent Document 33), a technique of adding a surface-crosslinking agent in advance after heat treatment (Patent Document 34), a technique of defining oxygen partial pressure (Patent Document 35), techniques of defining the spraying conditions and dew points (Patent Documents 37, 38), techniques of defining the mixing conditions of treatment liquids (Patent Documents 39, 40), and a technique paying attention to a cooling step (Patent Document 41) and the like.

PRIOR ART DOCUMENTS

Patent Documents

Patent Document 1: U.S. Pat. No. 6,297,319
Patent Document 2: U.S. Pat. No. 6,372,852
Patent Document 3: U.S. Pat. No. 6,265,488
Patent Document 4: U.S. Pat. No. 6,809,158
Patent Document 5: U.S. Pat. No. 4,734,478
Patent Document 6: U.S. Pat. No. 4,755,562
Patent Document 7: U.S. Pat. No. 4,824,901
Patent Document 8: U.S. Pat. No. 6,239,230
Patent Document 9: U.S. Pat. No. 6,559,239
Patent Document 10: U.S. Pat. No. 6,503,979
Patent Document 11: U.S. Pat. No. 6,472,478
Patent Document 12: U.S. Pat. No. 6,657,015
Patent Document 13: U.S. Pat. No. 5,409,771
Patent Document 14: U.S. Pat. No. 5,422,405
Patent Document 15: US Patent Application Publication No. 2005/048221
Patent Document 16: U.S. Pat. No. 4,783,510
Patent Document 17: EP Patent No. 1824910
Patent Document 18: U.S. Pat. No. 5,206,205
Patent Document 19: EP Patent No. 0603292
Patent Document 20: U.S. Pat. No. 6,605,673
Patent Document 21: U.S. Pat. No. 6,620,899
Patent Document 22: U.S. Pat. No. 7,312,278
Patent Document 23: U.S. Pat. No. 5,610,208
Patent Document 24: US Patent Application Publication No. 2007/078231
Patent Document 25: US Patent Application Publication No. 2005/029352
Patent Document 26: U.S. Pat. No. 5,140,076

Patent Document 27: U.S. Pat. No. 6,071,976
Patent Document 28: US Patent Application Publication No. 2004/240316
Patent Document 29: International Publication No. 2007/065840 pamphlet
Patent Document 30: US Patent Application Publication No. 2007/149760
Patent Document 31: Japan Patent Application Publication No. 2004-352941
Patent Document 32: U.S. Pat. No. 6,514,615
Patent Document 33: U.S. Pat. No. 5,672,633
Patent Document 34: International Publication No. 2009/028568 pamphlet
Patent Document 35: US Patent Application Publication No. 2007/0293632
Patent Document 36: U.S. Pat. No. 6,720,389
Patent Document 37: U.S. Pat. No. 7,183,456
Patent Document 38: US Patent Application Publication No. 2007/161759
Patent Document 39: US Patent Application Publication No. 2006/057389
Patent Document 40: EP Patent No. 0534228
Patent Document 41: U.S. Pat. No. 7,378,453

DISCLOSURE OF THE INVENTION

Problems to be Solved by the Invention

As mentioned above, it is difficult to satisfy increasing demands for physical properties such as water absorption capacity under load and liquid permeability of a water-absorbing resin only by a conventional surface-crosslinking technique, although there have been proposed many techniques of surface-crosslinking agents (see Patent Documents 1 to 13) and their combination use (see Patent Document 14), auxiliary agents for surface-crosslinking (see Patent Documents 20 to 25), their mixing apparatuses (see Patent Documents 26 to 29) and heating treatment apparatuses (Patent Documents 30, 31), and also various kinds of conditions (see Patent Documents 32 to 41) and the like. Along with change of a surface-crosslinking agent and use of a new auxiliary agent, it may be sometimes accompanied with an increase in cost, a decrease in safety, deterioration of other physical properties (e.g., coloration of water-absorbing resin), and the like. Although causing an effect to a certain extent in a small scale in an experimental laboratory level or batch type production, the above-mentioned conventional art means may not sometimes show so much effective in an industrial scale (e.g., production volume is 1 [t/hr] or more) such as large scale continuous production as compared with that in a small scale.

The present invention has been completed from the viewpoint of the conventional problems, and an object of the present invention is to provide a method for producing a water-absorbing resin powder which is excellent in physical properties and surface-crosslinked efficiently at a low cost while assuring high productivity.

More concretely, the present invention aims to provide a method for solving a problem occurring in the case of adding water before surface-crosslinking of a water-absorbing resin powder, or adding water after surface-crosslinking thereof, or adding water after surface-crosslinking, particularly, adding water simultaneously with cooling after surface-crosslinking, which is applicable in an industrial scale. That is, the present invention aims to provide a process for producing a water-absorbing resin powder which stabilizes production and prevents deterioration in physical properties. More particularly, in the production of a surface-crosslinked water-absorbing resin powder in an industrial scale, the present invention aims to solve problems from the viewpoint of production and to provide a process for producing a water-absorbing resin powder to which a given amount of water is added or which containing a given amount of water, which is low in dust content and is excellent in physical properties, in a manner of causing no physical property deterioration of a water-absorbing resin, capable of carrying out stable operation for a long term (e.g., preferably 10 days or longer, more preferably 30 days or longer, and particularly preferably 100 days or longer), and stabilizing (decrease of standard deviation) and/or improving (improvement of AAP) the physical properties.

Solutions to the Problems

To solve the above-mentioned problems, inventors of the present invention have made investigations on the surface-crosslinking step and finally solved the problems by carrying out classification before substantial conveying (before the mechanical conveying step) after water addition.

That is, a process for producing a water-absorbing resin powder of the present invention is to provide a process thereof, sequentially comprising:
a first classification step for a water-absorbing resin,
a surface-crosslinking step after the classification,
a water addition step to a water-absorbing resin powder in at least one stage of after surface-crosslinking, during surface-crosslinking, and before surface-crosslinking,
a second classification step, and
a conveying step.

As a preferable embodiment of the present invention, the second classification step is set before the conveying step and an apparatus to be used in the second classification step is joined to a lower part of the apparatus for adding water in the water addition step.

Also as an another preferable embodiment of the present invention, the second classification step is a step of separating at least unsteady agglomerates of the water-absorbing resin powder.

Still as an another preferable embodiment of the present invention, the conveying step after the surface-crosslinking step or particularly the second classification step is a step of conveying the water-absorbing resin powder upward in the perpendicular direction (that is, the water-absorbing resin powder is lifted from the lower side to the upper side).

Effects of the Invention

According to the present invention, in continuous production in a large industrial scale (particularly, production amount of 1 [t/hr] or more), the physical properties (e.g., water absorption capacity under load and liquid permeability) can be improved after surface-crosslinking and the fluctuation of physical property (standard deviation) can be narrowed.

In the process for producing a water-absorbing resin powder of the present invention, the surface-crosslinking step involves mixing water-absorbing resin particles with a surface-crosslinking agent (aqueous solution) at a prescribed ratio by a humidifying and mixing apparatus (humidifying and mixing step); heating treatment the mixture by a heating treatment apparatus (heating treatment step); and then adding a water-based liquid (the water-based liquid will be described later) (water addition step) at the time of cooling treatment by a cooling apparatus (cooling step). At this time, generated unsteady agglomerates of the water-absorbing resin powder are removed to give a water-absorbing resin powder having excellent physical properties.

BRIEF DESCRIPTION OF DRAWINGS

FIG. 1 is a schematic process flow chart showing one example of production process of water-absorbing resin powder of the present invention.

MODE FOR CARRYING OUT THE INVENTION

Hereinafter, the water-absorbing resin powder of the present invention and a method for producing the same will be described in detail in reference to the schematic process flow chart shown in FIG. 1; however, the scope of the present invention is not restricted to the following specification, and those other than the following examples can be properly modified and carried out in a range where the gist of the present invention is not impaired. Specifically, the present invention is not limited to each of the following embodiments, and various modifications can be made within a range shown by the claims and embodiments carried out by properly combining each technical means disclosed with different embodiments are also included within the technical scope of the present invention.

[1] Definition of Terms (1-1) "Water-Absorbing Resin"

In the present specification, a "water-absorbing resin" means a water-swellable and water-insoluble polymer gelling agent. Here in, a "water-swelling property" means a CRC (water absorption capacity without load) defined in $ER_T$ 441.2-02 in amount of 5 [g/g] or more. And a "water-insolubility" means an Ext (water extractables) defined in ERT 470.2-02 in amount of 0 to 50 weight %.

The water-absorbing resin may be properly designed in accordance with the application and is not particularly limited, but preferably a hydrophilic crosslinked polymer obtained by crosslinking polymerization of an unsaturated monomer having a carboxyl group. Alternatively, the water-absorbing resin is not limited to a substance entirely (100 wt. %) composed of a polymer but may contain an additive or the like to an extent that the above-mentioned properties can be maintained. In the present invention, even a water-absorbing resin composition containing a small amount of an additive is generically called as a water-absorbing resin. Examples of the form of the water-absorbing resin include a sheet-like form, a fibrous form, a film-like form and a gel form and the like. The water-absorbing resin is preferably in a powder form and particularly preferably in a powder form having a particle size distribution or a moisture content described later. In this specification, a water-absorbing resin before surface-crosslinking is named as "water-absorbing resin particles" and water-absorbing resin particles to which a surface-crosslinking agent is added are named as a "water-absorbing resin powder".

(1-2) "Polyacrylic Acid (Salt)"

In the present specification, a "polyacrylic acid (salt)" means a polymer that is formed mainly of acrylic acid and/or its salt (hereinafter mentioned as acrylic acid (salt)) as the repeating unit and that contains optionally graft components.

More specifically, the polyacrylic acid (salt) means a polymer that contains acrylic acid (salt) as a total monomer used for polymerization (except cross-lining agents) in an amount of necessarily 50 to 100 mol %, preferably 70 to 100 mol %, more preferably 90 to 100 mol %, and particularly preferably substantially 100 mol %.

(1-3) "EDANA" and "ERT"

"EDANA" is an abbreviated expression for European Disposables and Nonwovens Association, and "ERT" is an abbreviated expression for the measurement methods of water-absorbing resins (EDANA Recommended Test Methods) under the European standards (approximately the world standards). In the present specification, the physical properties of water-absorbing resins and the like are measured by reference to the original text of ERT (known literature, revised in 2002), unless otherwise indicated.

(a) CRC (ERT441.2-02)

The "CRC" is an abbreviation for Centrifuge Retention Capacity and means water absorption capacity without load (simply sometimes referred to as "water absorption capacity"). Specifically, the CRC is the water absorption capacity (unit; g/g) after 0.200 g of a water-absorbing resin in a nonwoven fabric bag is freely swollen in large excess of 0.9 wt. % sodium chloride aqueous solution for 30 minutes and dewatered by a centrifuge (at 250 G).

(b) AAP (ERT442.2-02)

The "AAP" is an abbreviation for Absorption Against Pressure and means water absorption capacity under load. Specifically, the APP is the water absorption capacity (unit; g/g) after 0.900 g of a water-absorbing resin is swollen in 0.9 wt. % sodium chloride aqueous solution for 1 hour under 2.06 kPa (21 [g/cm$^2$]) load. In the present invention and examples, the measurement is carried out at 4.83 kPa (49 [g/cm$^2$]) for 1 hour.

(c) Ext (ERT 470.2-02)

"Ext" is an abbreviation for Extractables and means the amount of water soluble components (dissolve amount). Specifically, measurement is carried out by adding 1.000 g of the water-absorbing resin to 200 g of an 0.9 wt. % sodium chloride aqueous solution, stirring the solution for 16 hours, and measuring the amount of a dissolved polymer by pH titration (unit: wt. %).

(d) Residual Monomers (ERT410.2-02)

The "residual monomers" means the amount of monomers remaining in a water-absorbing resin. Specifically, the amount of monomers is a value (unit; ppm) obtained by measuring, after 1.0 g of a water-absorbing resin is charged to 200 ml of 0.9 wt. % sodium chloride aqueous solution and the resultant is stirred for 2 hours, the amount of monomers eluted in the aqueous solution by using high-pressure liquid chromatography.

(e) PSD (ERT420.2-02)

The "PSD" is an abbreviation for Particle Size Distribution and means the particle size distribution measured by sieving classification. The weight average particle diameter (D50) and the particle diameter distribution width can be measured by the same method as in "(1) Average Particle Diameter and Distribution of Particle Diameter" described in European Patent No. 0349240, p. 7, lines 25-43.

(f) Measurement of Other Physical Properties of Water-Absorbing Resin Set Forth in EDANA "pH" (ERT400.2-02), It represents pH of a water-absorbing resin.

"Moisture Content" (ERT430.2-2), It represents a Moisture Content of a water-absorbing resin.

"Flow Rate" (ERT450.2-02), It represents a Flow Rate of a water-absorbing resin.

"Density" (ERT460.2-02), It represents a Bulk Specific Density of a water-absorbing resin.

"Respirable Particles" (ERT480.2-02), It represents a water-absorbing resin powder dust in breathable region.

"Dust" (ERT490.2-02), It represents powder dust contained in a water-absorbing resin.

(1-4) "Liquid Permeability"

The "liquid permeability" means the flow of a liquid flowing among particles of swollen gel under a load or no load. The "liquid permeability" can be measured by SFC (Saline Flow Conductivity) or GBP (Gel Bed Permeability) as a representative measurement method.

The "SFC" (Saline Flow Conductivity) is liquid permeability of 0.69 wt. % sodium chloride aqueous solution in a 0.9 g of water-absorbing resin at a load of 0.3 psi. It is measured according to an SFC testing method described in U.S. Pat. No. 5,669,894. And the "GBP" (Gel Bed Permeability) is liquid permeability of 0.69 wt. % sodium chloride aqueous solution in a water-absorbing resin under a load or without load. It is measured according to a GBP testing method described in International Publication 2005/016393 pamphlet.

(1-5) Others

In this specification, "X to Y" showing a range means "X or more and Y or lower". Additionally, the unit of weight "t (ton)" means "Metric ton", and further, "ppm" means "ppm by weight" or "ppm by mass" unless otherwise indicated. And in the present specification, "mass" and "weigh", "mass %" and "wt. %", also "parts by mass" and "parts by weight" is used as a synonym, and further, " . . . acid (salt)" means " . . . acid and/or its salt", "(meth) acrylic" means "acrylic and/or meth acrylic"

[2] a Process for Producing a Water-Absorbing Resin Powder (Features of the Present Invention)

A process for producing a water-absorbing resin powder of the present invention is to provide a process for producing a water-absorbing resin powder, sequentially comprising: a first classification step for a water-absorbing resin, a surface-crosslinking step after the classification, a water addition step to a water-absorbing resin powder in at least one stage of after surface-crosslinking, during surface-crosslinking, and before surface-crosslinking, a second classification step (before substantial conveying), and a conveying step.

The "before substantial conveying" means a state where there is no conveying step before the second classification step after surface-crosslinking, or a state where the second classification step directly follows immediately after the surface-crosslinking step, or a state where the conveying step before the second classification step after the surface-crosslinking is shorter than the conveying step after the second classification step, particularly, a state where the conveying distance in the conveying step before the second classification step is $1/5$ or less, further $1/10$ or less, and particularly $1/50$ or less of the conveying distance (m) in the conveying step after the second classification step.

As a preferable state, the conveying step after the second classification step includes a step of conveying the water-absorbing resin powder upward in a perpendicular direction (that is, the water-absorbing resin powder is lifted up from a lower side).

In addition, "before surface-crosslinking" involving the step of adding water to the water-absorbing resin powder means before the surface-crosslinking reaction (the heating treatment step), preferably before the heating treatment apparatus which is for carrying out the surface-crosslinking reaction, and more preferably the time of mixing the surface-crosslinking agent (humidifying and mixing step). "After surface-crosslinking" involving the step of adding water to the water-absorbing resin powder means after the surface-crosslinking reaction (the heating treatment step), preferably after the heating treatment apparatus, and more preferably the time of mixing the additive by water addition after the surface-crosslinking reaction (e.g., the water addition step and the cooling step are carried out simultaneously and at this time, a transverse type continuous stirring apparatus is used. Herein, water may contain additives described later). Consequently, "during surface-crosslinking" means addition of water at the time of surface-crosslinking reaction and preferably addition of water with a heating treatment apparatus (the heating treatment step).

As a preferable embodiment of the present invention, the second classification step is set before the conveying step and an apparatus to be used in the second classification step is joined to a lower part of the apparatus for adding water in the water addition step. Also as an another preferable embodiment of the present invention, the second classification step is a step of separating at least unsteady agglomerates of the water-absorbing resin powder.

The water-absorbing resin powder of the present invention is produced by subjecting an aqueous solution containing a hydrophilic monomer and a crosslinking agent to polymerization, drying the obtained water-containing gel-like crosslinked polymer (hereinafter, referred to as a "hydrogel"), thereafter pulverizing and classifying the water-absorbing resin particle, and carrying out surface treatment such as surface-crosslinking for the obtained water-absorbing resin particles.

In the present invention, the water-absorbing resin particles to be subjected to the surface-crosslinking step are not particularly limited and those produced by a known production process may be used. For example, the water-absorbing resin particles to be subjected to the surface-crosslinking step can be obtained through a production process involving a polymerization step, a gel-crushing step, a drying step, a pulverizing step, and a first classification step described later.

(2-1) Polymerization Step

A water-absorbing resin used in the present invention is not specifically limited but preferably a polyacrylic acid (salt)-type water-absorbing resin which is obtained by aqueous solution polymerization or reverse phase suspension polymerization of monomer aqueous solution containing acrylic acid (salt) as a main component and internal crosslinking agent in amount of preferably 0.001 to 10 mole % and more preferably 0.01 to 2 mole %. In the present invention, from the view point of properties and easiness of polymerization control, the polymerization method may be carried out by, in general, aqueous solution polymerization or reverse phase suspension polymerization but preferably it is carried out by aqueous solution polymerization and still more preferably continuous aqueous solution polymerization.

And acrylic acid (salt) is contained in the above-mentioned monomer as a main component and the content thereof is preferably 50 to 100% by mole, more preferably 70 to 100% by mole and particularly preferably 90 to 100% by mole. Furthermore, from the viewpoint of water absorption characteristics, the acid groups of a polymer are preferable to be neutralized and the neutralization rate is preferably 10 to 100% by mole, more preferably 30 to 95% by mole, still more preferably 50 to 90% by mole, and particularly preferably 60 to 80% by mole. The neutralization may be carried out for the polymer (hydrogel) after polymerization or for the monomer.

Also, use of a crosslinking agent (i.e.; first crosslinking) is preferable at the time of polymerization. Examples usable as the crosslinking agent are preferably co-polymerizable crosslinking agents with polymerizable double bond of the acrylic acid or reactive crosslinking agents with a carboxyl group. Concrete examples are, crosslinking agents disclosed in such as following patent documents can be used, polyfunctional acrylate such as polyethylene glycol diacrylate, and polyallylamine, polyol, polyglycidyl compound and the like.

The above mentioned preferable continuous aqueous solution polymerization may include methods described as continuous kneader polymerization (e.g. U.S. Pat. Nos. 6,987,151 and 6,710,141 and International Publication No. 2006/034806), continuous belt polymerization (e.g. U.S. Pat. Nos. 4,893,999 and 6,241,928, and US Patent Application Publication No. 2005/215734). With the continuous kneader polymerization and the continuous belt polymerization, water-absorbing resin powder can be produced in higher productivity. Above mentioned polymerization method is preferably applicable to production apparatus used in a huge scale of production amount per one line. The production amount is preferably 0.5 [t/hr] or higher, more preferably 1 [t/hr] or higher, still more preferably 5 [t/hr] or higher, and particularly preferably 10 [t/hr] or higher.

In addition, polymerization at a temperature starting at 30° C. or higher, preferably 35° C. or higher, more preferably 40° C. or higher, still more preferably 50° C. or higher, particularly preferably 60° C. or higher, and most preferably 70° C. or higher (the upper limit is the boiling point) in the continuous aqueous solution polymerization at a high temperature starting or a monomer concentration, preferably 35 wt. % or higher, more preferably 40 wt. % or higher, still more preferably 45 wt. % or higher, particularly preferably 50 wt. % or higher, and most preferably 55 wt. % or higher (the upper limit is the saturated concentration) in the continuous aqueous solution polymerization at a high monomer concentration, and further, combination above in the continuous aqueous solution polymerization at a high temperature starting and high monomer concentration can be exemplified as one preferable example. The continuous aqueous solution polymerization at a high temperature starting and high monomer concentration can be exemplified described in U.S. Pat. Nos. 6,906,159 and 7,091,253 and the like.

A polymerization initiator to be used for the present invention is not specifically limited and can be selected properly in accordance with the polymerization mode. Examples of the polymerization initiator may include a photodecomposition type polymerization initiator, a heat decomposition type polymerization initiator, and a redox type polymerization initiator and the like as exemplified in the above patents. Among them water soluble polymerization initiator is preferably used.

Examples of the above mentioned photodecomposition type polymerization initiator may include benzoin derivatives, benzyl derivatives, acetophenone derivatives, benzophenone derivatives, and azo compounds and the like. Examples of the above mentioned heat decomposition type polymerization initiator may include persulfate such as sodium persulfate, potassium persulfate, and ammonium persulfate, peroxides such as hydrogen peroxide, tert-butyl peroxide, methyl ethyl ketone peroxide, azo compounds such as 2,2'-azobis(2-amindinopropane) dihydrochloride, 2,2'-azobis[2-(2-imidazolin-2-yl)propane]dihydrochloride, etc. Also, examples of the above mentioned redox type polymerization initiator may include the above-mentioned persulfate or peroxides in combination with reducing compounds such as L-ascorbic acid and sodium hydrogen sulfite.

Further, combination use of a photodecomposition type initiator and a heat decomposition type polymerization initiator can also be exemplified as a preferable embodiment.

The amount of the polymerization initiator may be preferably 0.0001 to 1% by mole and more preferably 0.0005 to 0.5% by mole relative to the monomer. In the case of the amount of the polymerization initiator is more than 1% by mole, coloring of water-absorbing resin powder may possibly generate which is not preferable and in the case of the amount is lower than 0.0001% by mole, it results in increase of the residual monomer which is not preferable.

(2-2) Gel-Crushing Step

In the present invention, a hydrogel obtained by the above mentioned polymerization step may be dried as it is; however, a hydrogel may be preferably gel-crushed to be particulate (e.g., with a weight average particle diameter (D50) of preferably 0.1 to 5 mm, more preferably 0.5 to 3 mm) during polymerization or after polymerization with a gel-crusher (kneader, meat chopper, or the like). The hydrogel gel-crushed to be particulate may be called as "Particulated hydrogel".

In the present pulverization gel-crushing step, from the viewpoint of the physical property and particle size control, regarding the temperature of the hydrogel at the time of gel-crushing, the hydrogel is kept or heated preferably 40° C. or higher, and more preferably 50° C. or higher for the lower limit and preferably 95° C. or lower, and more preferably 80° C. or lower for the upper limit.

The resin solid content of the hydrogel is not particularly limited; however, from the viewpoint of the physical property, it is preferably 10 wt. % or more, more preferably 15 wt. % or more, and still more preferably 30 wt. % or more for the lower limit and preferably 70 wt. % or lower, more preferably 65 wt. % or lower, and still more preferably 55 wt. % or lower for the upper limit. It is optional to add water, a polyhydric alcohol, a mixed liquid of water and a polyhydric alcohol, a solution obtained by dissolving a polyvalent metal in water, or their vapor, or the like during gel-crushing. In the gel-crushing step, a water-absorbing resin fine powder (e.g., water-absorbing resin of lower than 150 μm of its particle diameter), or various kinds of other additives may be kneaded.

(2-3) Drying Step

In the drying step of the present invention, drying methods is not specifically limited unless the hydrogel obtained by the above mentioned polymerization step or particulated hydrogel obtained by the above mentioned gel-crushing step can be dried at a level of predetermined resin solid content. A various drying methods such as heat drying, hot-air drying, vacuum drying, fluid bed drying, infrared ray drying microwave drying, drying by a drum drier, azeotropic dehydration with a hydrophobic organic solvent, high humidity drying using high temperature steam can be employed. Among them, hot-air drying is preferable and it is preferably hot-air drying with a gas with a dew point of preferably 40 to 100° C. and more preferably 50 to 90° C.

The drying temperature is not particularly limited; however, it is preferably 100° C. or higher, more preferably 150° C. or higher, still more preferably 160° C. or higher and particularly preferably 165° C. or higher for the lower limit, and preferably 300° C. or lower, more preferably 250° C. or lower, still more preferably 235° C. or lower and particularly preferably 230° C. or lower for the upper limit. Further the drying time is not particularly limited, however, the upper limit is preferably within 50 minutes. When the drying temperature or the drying time is out of the above-mentioned range, which is not preferable since it may possibly result in decrease of the water absorption capacity (CRC), increase of water soluble components (Extractables), and deterioration of coloration (lowered whiteness index) and the like.

In the drying step of the invention, dried polymer having a resin solid content below can be obtained. The drying step provides a dried polymer having a resin solid content, which is calculated from a drying loss of the polymer (drying of 1 g powder or particles at 180° C. for 3 hours) in an amount controlled to be preferably 80 wt. % or higher, more preferably 85 wt. % or higher, still more preferably 90 wt. % or higher, and particularly preferably 92 wt. % or higher for the lower limit and preferably 99 wt. % or lower, more preferably 98 wt. % or lower and still more preferably 97 wt. % or lower for the upper limit.

In the present inventive production method, in order to accomplish a decrease in residual monomers, prevention of gel deterioration (urea resistance improvement), and prevention of yellowing and the like, the time (interval time) until the start of drying via the gel-crushing step is preferable as it is shorter. That is, after being discharged out of the polymerization apparatus, a hydrogel is charged to the drier preferably within 1 hour, more preferably within 0.5 hours, and still more preferably within 0.1 hours. In order to set the time within the range, gel-crushing or drying is preferably carried out directly without carrying out a storage step for the hydrogel after polymerization. Further, to decrease the residual monomer and accomplish low coloring, the temperature of the a hydrogel from completion of the polymerization to starting of the drying (interval time) is controlled preferably 50° C. or higher and more preferably 60° C. or higher for the lower limit and preferably 80° C. or lower and more preferably 70° C. or lower for the upper limit.

(2-4) Pulverization Step/First Classification Step

In the present invention, the dried polymer obtained in the drying step is pulverized thereafter if necessary (at this stage, the water-absorbing resin has become, for example, particles in a pulverized state) and the particle size is controlled through the classification step to obtain water-absorbing resin particles.

From the viewpoint of the physical properties of the water-absorbing resin powder of the present invention, the water-absorbing resin particles are required to have a specified particle size and thus classified preferably before the surface-crosslinking step described later (first classification), particularly classified by sieving. Additionally, the classification (second classification step) after the surface-crosslinking step is indispensable to be carried out and it is preferable to further carry out a third classification step after the conveying. In the present invention, particle size control is defined by a standard sieve (JIS Z8801-1 (2000)).

Regarding the pulverizing, the method (apparatus) is not particularly limited as long as a larger quantity of water-absorbing resin particles with a desired particle size (the weight average particle diameter is preferably 200 to 600 μm) are obtained and a conventionally known pulverizing apparatus can be used. Specific examples thereof include a roll mill, a hammer mill, a roll granulator, a jaw crusher, a gyratory crusher, a cone crusher, a roll crusher, and a cutter mill and the like. From the viewpoint of particle size control, among them, it is preferable to use a roll mill or a roll granulator in multistage.

Examples of the classification method include classification by sieving and classification by blowing and the like disclosed in U.S. Pat. No. 6,164,455, International Publication Nos. 2006/074816, 2008/037672, 2008/037673, 2008/037675, 2008/123477, and 2010/032694 and the like. The larger and the smaller particles than those with the intended particle size are removed by the classification and if necessary, pulverizing is carried out again.

From the viewpoint of improvement of the physical properties of the water-absorbing resin powder to be obtained by the present invention, it is preferable to control the particle size as follows. That is, the weight average particle diameter (D50) of the water-absorbing resin particles before surface-crosslinking is preferably 200 to 600 more preferably 200 to 550 μm, still more preferably 250 to 500 μm, and particularly preferably 350 to 450 μm. It is better that the rate of fine particles (hereinafter, sometimes referred to as "water-absorbing resin fine particles") which pass through a sieve (JIS standard sieve) with meshes of 150 μm are smaller and the rate is preferably 0 to 5 wt. %, more preferably 0 to 3 wt. %, and still more preferably 0 to 1 wt. % relative to the entire water-absorbing resin particles. It is also better that the ratio of large particles (hereinafter, sometimes referred to as "coarse particles") which do not pass through a sieve (JIS standard sieve) with meshes of 850 preferably 710 are smaller and the rate is preferably 0 to 5 wt. %, more preferably 0 to 3 wt. %, and still more preferably 0 to 1 wt. % relative to the entire water-absorbing resin particles. The logarithmic standard deviation (σξ) of the particle size distribution is preferably 0.20 to 0.40, more preferably 0.25 to 0.37, and still more preferably 0.27 to 0.35. The particle size is measured using a standard sieve according to the method disclosed in EDANA-ERT 420.2-02, with reference to the method of International Publication 2004/69915.

In general, if the particle size distribution is narrowed, that is, if the particle size is so controlled as to make the upper and lower limits close to each other, coloration of the water-absorbing resin becomes noticeable from the viewpoint of color hue measurement; however, such a color hue issue is not caused in the present invention and thus the present invention is preferable. Accordingly, regarding the particle size distribution of the water-absorbing resin particles to be obtained in this step, the rate of particles having a particle diameter of 150 to 850 μm is preferably not lower than 95 wt. % and more preferably not lower than 98 wt. % (the upper limit is 100 wt. %).

The bulk specific gravity of the water-absorbing resin particles obtained by this step is preferably 0.5 to 0.75 (g/cm$^3$) and more preferably 0.6 to 0.7 (g/cm$^3$). In the case where the bulk specific gravity is not satisfied the range, the stirring power index of a transverse type continuous stirring apparatus used in the surface-crosslinking step becomes difficult to be controlled, and further, it is not preferable since the physical properties of the water-absorbing resin powder may be lowered or powdering may be caused.

In the case classification by sieving is employed in the present invention, a classification apparatus to be employed is not particularly limited as long as it has a sieving mesh face. Examples thereof include those classified into fixed lattices, vibrating screens, and shifters. The vibrating screens may include a slanting type, a Low-head type, Hum-mer, Rhewum, Ty-Rock, Gyrex, and Eliptex and the like. The shifters may include a Reciprocating type, Exolon-grader, Traversator-sieb, Sauer-meyer, a Gyratory shifter, a gyro-shifter, and Ro-tex screen and the like. These screens and shifters may be vibrated or fixed and are sub-classified preferably in accordance with the movement of the mesh face (circular, elliptical, straight line, arc, pseudo-elliptical, spiral, and helical); the vibration manner (free vibration and forcible vibration); the driving manner (eccentric shaft, unbalanced weight, electromagnet, and impact); the tilt of the mesh face (horizontal and slanting); the installation manner (setting on floor and hanging); and the like. From the viewpoint of the effect of the present invention, preferable one among them is a classifying apparatus in which a sieving mesh face is spirally moved by combining radial tilt (tilt of sieving mesh for dispersing a material from the center to the periphery) and tangential tilt (tilt of sieving mesh for controlling the discharge speed on the mesh) like swinging type ones (Tumbler-Screening machines).

In the present invention, it is preferable to remove electricity by the classification by sieving and further, it is preferable to remove electricity also in the pulverization step. In order to solve the problems of the present invention, in addition to the pulverization step, the classification step is also preferably carried out in reduced pressure. Furthermore, in order to solve the problems of the present invention, in addition to the pulverization step, the classification step is also preferably controlled at a constant temperature.

Similarly to the first classification step, the second classification step and the third classification step described later can be carried out with the classification apparatus and further, similarly to the first classification step, these steps are preferably carried out with electricity removal, reduced pressure and constant temperature.

(Electricity Removal)

In the classification by sieving in the present invention, it is preferable to remove electricity. In addition, it is preferable to remove electricity also in the pulverization step. Since the physical properties, particularly, liquid permeability (e.g., SFC), of the surface-crosslinked water-absorbing resin are improved by removing electricity in the pulverization step and/or the classification step, the electricity removal is preferably carried out. The effect is more significantly caused on large scale continuous industrial production and the like of a water-absorbing resin, particularly on production of a water-absorbing resin with a high SFC (e.g., $10[\times 10^{-7} \cdot cm^3 \cdot s \cdot g^{-1}]$ or higher) at 1 [t/hr] or higher continuously for 24 hours or longer rather than on small scale production of laboratory level.

The electricity removal in the classification step is carried out for at least one of the classification apparatus, the water-absorbing resin, and the sieve. Since these three components are in contact with each other, it is enough to remove electricity for either one of them and it is preferable to remove electricity for the classification apparatus and/or the sieve.

A method for removing electricity is not particularly limited and examples thereof include the following methods (A) to (C). The leakage current at the time of the electricity removal is preferably led to the ground through an earth with the following earthing resistance.

Method (A), Antistatic brush: Method for removing electricity for sieve generating static electricity Method (B), Ion generation brush: Method for removing electricity by generating ions by high voltage application Method (C), Earth: Method for removing static electricity generated in devices such as rotating objects In the case of using an antistatic brush in the above-mentioned method (A), an employable method may be a self-discharge method for making a gap between an antistatic brush and a charged object, or an earthing and leaking method for electricity removal by taking out accumulated static electricity as leakage current by bringing an earthed antistatic brush into contact with a charged object. The antistatic brush is produced from stainless fibers, carbon fibers, amorphous fibers, chemical fibers, plant fibers, animal hair, or the like and the fiber diameter is preferably 1 to 100 μm and more preferably about 5 to 20 μm. The fiber length is preferably 1 to 100 nm and moreover, an antistatic brush made of ultra-thinly processed stainless steel is preferable.

In the case of using an ion generation brush in the method (B), an ionizer may be used. The method (B) is a method for electrical neutralization by measuring the quantity of electric charge and the electrification charge of the classification apparatus or the water-absorbing resin and applying an opposite charge to the positive charge or the negative charge. That is, the electricity removal by the method (B) is for generating ions in air or another gas and neutralizing the electrification charge by the generated ions. In other words, the optimum electricity removal corresponding to the electrically charged state of an object and the control of ion balance can be satisfied together. The quantity of the electric charge of an object may be measured by measuring ion current by an ion current detection circuit built in a controller. The above-mentioned method (B) is one of preferable methods for a water-absorbing resin since static electricity is entirely made powerless by neutralizing the electric charge with an opposite charge.

In the case of employing an earth in the method (C), it is a method for electricity removal by (electrically) connecting a building or a stand, in which an apparatus for classification or the like is installed, with an earth showing the following earth resistance and extracting the static electricity accumulated in the apparatus as leakage current by the contact with a charged object. The method (C) is a simple method and highly effective since the entire apparatus for classification or the like works as an electricity removal apparatus, and one of preferable methods for a water-absorbing resin.

The "earth resistance" shows resistance to electric current flowing from an earth electrode buried in the soil for earthing to the ground. To measure the earth resistance, a commercially available earth-resistance meter may be employed. The earth resistance is in a range of preferably 100Ω or lower, more preferably 10Ω or lower, and still more preferably 5Ω or lower. The lower limit of the earth resistance is not particularly limited and a lower value is more desirable, but it is generally 1Ω or higher.

(Surface Roughness, Material, Etc.)

In the present invention, from the viewpoint of physical property improvement, the surface roughness of the sieving apparatus is preferably 800 nm or lower and the material of the sieving apparatus is preferably stainless steel. The physical properties are further improved by mirror-finishing stainless steel. Examples of the stainless steel include SUS 304, SUS 316, and SUS 316 L and the like.

The surface roughness (Rz) (defined in JIS B 0601-2001) of the inner surface of the sieving apparatus to be used in the present invention is preferably 800 nm or lower, more preferably 150 nm or lower, still more preferably 50 nm or lower, and particularly preferably 25 nm or lower. The surface roughness (Rz) means the maximum value of the highest height (μm) of uneven surface and can be measured by a stylus type surface roughness tester according to JIS B 0651-2001 or an optical interference type surface roughness tester according to JIS B 0652-2002.

(2-5) Surface-Crosslinking (Second Crosslinking) Step

The present invention further involves a surface-crosslinking step after the drying step. The production process of the present invention is preferably applicable to a method for producing a water-absorbing resin powder with high water absorption against pressure (AAP) and liquid permeability (SFC) and continuous manufacture in a huge scale (particularly a production amount [1 t/hr] or more), and particularly preferably applicable to a method for producing a water-absorbing resin powder with high temperature surface-crosslinking reaction. The technique for the surface-crosslinking of the present invention is not limited as long as the crosslinking (second crosslinking) can be carried our further in the surfaces of the water-absorbing resin particles. Examples thereof include techniques such as use of a surface-crosslinking agent, polymerization of a monomer on the resin surface, and use of a radical polymerization initiator, and a technique of using a surface-crosslinking agent described later is preferably employed. In the present invention, the process involving the following "humidifying and mixing step", "heating treatment step", and "cooling step" is called as a "surface-crosslinking step".

(2-5-1) Humidifying and Mixing Step

This humidifying and mixing step is a step of adding and mixing a surface-crosslinking agent to and with the water-absorbing resin particles obtained through the polymerization step to the first classification step mentioned above. Humidification with the surface-crosslinking agent does not mean a narrow definition of increasing the humidity but adding and mixing a surface-crosslinking agent or a solution or dispersion thereof to and with the water-absorbing resin, particularly to and with the dried water-absorbing resin particles. An addition manner of the surface-crosslinking agent or a solution or dispersion thereof is not particularly limited. Regardless of whether it is a liquid, a gas, or a solid, the surface-crosslinking agent is mixed preferably in form of a solution, particularly in form of an aqueous solution.

(a) Surface-Crosslinking Agent

Treatment agents described in above mentioned Patent Documents 1 to 19, particularly surface-crosslinking agents, can be used as the surface-crosslinking agent in the present invention. Among them, from the viewpoint of physical properties, a surface-crosslinking agent forming a covalent bond with a functional group, particularly a carboxyl group, of the water-absorbing resin or an ion bonding surface-crosslinking agent are preferable and combination use of a covalent bond-forming surface-crosslinking agent and an ion bonding surface-crosslinking agent is more preferable.

(Covalent Bonding Surface-Crosslinking Agent)

Examples of a surface-crosslinking agent to be employed in the present invention may include various organic or inorganic surface-crosslinking agents. From the viewpoints of physical properties, examples to be used as the surface-crosslinking agent are polyhydric alcohol compounds, epoxy compounds, polyamine compounds or their condensation products with haloepoxy compounds, oxazoline compounds, (mono-, di-, or poly-)oxazolidinone compounds, and alkylene carbonate compounds and the like. Among them, dehydration reactive surface-crosslinking agents containing polyalcohol compounds, alkylene carbonate compounds, and oxazolidinone compounds, which require a high temperature reaction, are particularly preferable. In the case of using dehydration reactive surface-crosslinking agent, the improvement of physical properties and the effects of the present invention can be remarkably attained. Since a water-absorbing resin powder after surface-crosslinking using a dehydration reactive surface-crosslinking agent has low moisture content, the water-absorbing resin powder is preferably applicable for increase of the moisture content by water addition after the surface-crosslinking.

More concretely, examples of covalent bonding surface-crosslinking agent are compounds exemplified in U.S. Pat. Nos. 6,228,930, 6,071,976, and 6254990 and the like. Examples are polyalcohol compounds such as mono-, di-, tri-, or tetra-propylene glycol, 1,3-propanediol, glycerin, 1,4-butanediol, 1,3-butanediol, 1,5-pentanediol, 1,6-hexanediol, sorbitol; epoxy compounds such as ethylene glycol diglycidyl ether, glycidol; alkylene carbonate compounds such as ethylene carbonate; oxetane compounds; cyclic urea compounds such as 2-imidazolidinone, and the like.

(Ion-Bonding Surface-Crosslinking Agent)

Further, other than the above-mentioned covalent bonding surface-crosslinking agent (organic surface-crosslinking agent), an ion-bonding surface-crosslinking agent (inorganic surface-crosslinking agent) may be used to improve the liquid permeability or the like. Examples usable as the ion-bonding surface-crosslinking agent may include preferably divalent or higher, more preferably, trivalent to tetravalent polyvalent metal salts (organic salts or inorganic salts) or hydroxides and particularly preferably aluminum salt. Polyvalent metals are aluminum, zirconium, etc., and salt of polyvalent metals are aluminum lactate and aluminum sulfate and the like are exemplified.

These ion-bonding surface-crosslinking agents may be used simultaneously with or separately from the covalent bonding surface-crosslinking agent. The surface-crosslinking with polyvalent metals is exemplified in International Publication Nos. 2007/121037, 2008/09843, and 2008/09842, in U.S. Pat. Nos. 7,157,141, 6,605,673, and 6620889, in US Patent Application Publication Nos. 2005/0288182, 2005/0070671, 2007/0106013, and 2006/0073969 and the like.

Further, other than the above-mentioned covalent bonding surface-crosslinking agent, a polyamine polymer, particularly, having a weight average molecular weight of about 5000 to 1000000 may be used simultaneously or separately to improve the liquid permeability and the like. Usable polyamine polymers are exemplified in U.S. Pat. No. 7,098,284, International Publication Nos. 2006/082188, 2006/082189, 2006/082197, 2006/111402, 2006/111403, and 2006/111404 etc.

(The Use Amount)

In the present invention, the use amount of the surface-crosslinking agent may be arbitrarily determined by the compounds used and the combination thereof and the like, but it is preferably 0.001 to 10 parts by weight and more preferably 0.01 to 5 parts by weight relative to 100 parts by weight of the water-absorbing resin powder. In the case of using the covalent bonding surface-crosslinking agent and the ion-bonding surface-crosslinking agent in combination, the agents are used preferably in a range of mentioned above.

At the time the surface-crosslinking agent is added to the water-absorbing resin powder, water can be preferably used as the surface-crosslinking agent solution. The amount of water to be used is not specifically limited but it is preferably 0.5 to 20 parts by weight and more preferably 0.5 to 10 parts by weight relative to 100 parts by weight of water-absorbing resin powder. Further, at that time, a hydrophilic organic solvent may be used and its amount is not specifically limited but it is preferably 0 to 10 parts by weight and more preferably 0 to 5 parts by weight relative to 100 parts by weight of the water-absorbing resin powder. Still more, at the time of mixing the surface cross-linking agent with the water-absorbing resin powder, a water insoluble fine particle powder, and a surfactant may coexist to an extent that the effect of the present invention is not hindered, that is, for example, preferably 0 to 10 parts by weight, more preferably 0 to 5 parts by weight, and still more preferably 0 to 1 part by weight. The surfactant to be used and its use amount are exemplified in U.S. Pat. No. 7,473,739 etc.

(b) Mixing Apparatus

In the humidifying and mixing step, the water-absorbing resin particles are mixed with a surface treatment agent and water preferably by a continuous high speed rotating and stirring type mixing apparatus, more preferably by a vertical or transverse type continuous high speed rotating and stirring type mixing apparatus, and still more preferably by a transverse type continuous high speed rotating and stirring type mixing apparatus. In addition, the surface treatment agent refers to the above-mentioned surface-crosslinking agent, or a substituent thereof (e.g., a radical polymerization initiator such as a persulfate and a monomer) and is also a concept including a solution or dispersion liquid thereof. The stirring speed of the mixing apparatus is preferably 100 to 10000 rpm and more preferably 300 to 2000 rpm. The mixing (retention) time by the mixing apparatus is preferably within 180 seconds, more preferably 0.1 to 60 seconds, and still more preferably 1 to 30 seconds.

In this specification, "high speed mixing" means a mixing form that the mixing (retention) time of the water-absorbing resin particles with the surface treatment agent and water is preferably within 1 minute, more preferably within 0.5 minutes, and still more preferably within 0.1 minutes; or a mixing form that the stirring and rotating speed at the time of the mixing is preferably 100 rpm or more, and more preferably in the above-mentioned range.

On the other hand, "low speed mixing" means a mixing form that the mixing (retention) time exceeds 1 minute, further 5 minutes or longer, and particularly 10 minutes or longer; or a mixing form that the stirring and rotating speed at the time of the mixing is less than 100 rpm, and particularly in a range of 1 to 90 rpm.

From the viewpoint of the physical properties and productivity of the water-absorbing resin powder to be obtained, high speed mixing is employed in the present invention. In the case the mixing (retention) time and the stirring and rotating speed are satisfied together, the effect of the present invention is more sufficiently caused and therefore, it is preferable.

(c) Temperature of Water-Absorbing Resin Particle

In the present invention, the temperature of water-absorbing resin particles to be supplied to the surface-crosslinking step (humidifying and mixing step) is preferably 30° C. or higher, more preferably 40° C. or higher, and still more preferably 50° C. or higher. The upper limit thereof is preferably 100° C. or lower and more preferably 95° C. or lower. Deterioration of the physical properties of the water-absorbing resin powder can be suppressed by keeping the temperature of the water-absorbing resin particles within the range above. Specifically, a significant effect is caused on maintain of the physical properties such as saline flow conductivity (SFC).

(2-5-2) Heat Treatment Step

This heat treatment step is a step of heating the wet mixture of a water-absorbing resin powder and a surface treatment agent solution mixed in the humidifying and mixing step to cause surface-crosslinking reaction.

(Heating Apparatus)

A heating treatment apparatus to be used in heat treatment step of the present invention is preferably a continuous type heating treatment apparatus and examples thereof include various heating treatment apparatus such as a fluidized bed drier, a belt drier, a hot air drier, an infrared drier, a groove type mixing and drying apparatus, a rotary drier, a disk drier, a paddle drier, and a vibrating and fluidizing drier. Among them, from the viewpoints of improvement of physical properties and stabilization, a paddle drier is preferable.

As the heating treatment apparatus used in the heat treatment step, it is preferable to use a transverse type continuous stirring apparatus having a charging inlet and a discharge outlet for a water-absorbing resin powder as well as a stirring means including one or more of rotary shafts equipped with a plurality of stirring disks and a heating means.

(Stirring Power Index)

Also, the stirring power index of heating treatment apparatus to be used in the heat treatment step, the stirring power index is preferably to set to 3 to 15 [W·hr/kg], more preferably to set to 4 to 13 [W·hr/kg], still more preferably to set to 5 to 11 [W·hr/kg], particularly preferably to set to 5 to 10 [W·hr/kg], and most preferably to set to 5 to 9 [W·hr/kg]. If this stirring power index exceeds 15 [W·hr/kg], the physical properties (particularly, liquid permeability) are deteriorated and on the other hand, if it is under 3 [W·hr/kg], the physical properties (particularly, water absorption capacity under load) are also deteriorated.

"The stirring power index" means a parameter (see below formula) which can be calculated from the power consumption of apparatus at the time of surface treatment and the power consumption at the time of idling and become a benchmark to obtain a water-absorbing resin powder with high physical properties continuously and stably even at the time of scale-up to a large scale (particularly, 1 [t/hr] or more of production amount). Herein, it is defined as (stirring power index)=((power consumption of apparatus at the time of surface treatment)−(power consumption at the time of idling)×average retention time)/(treatment amount per unit time×average retention time).

The control of the stirring power index can be determined properly in consideration of adjustment of the supply amount and discharge amount of the water-absorbing resin powder, the particle size or bulk specific gravity of the water-absorbing resin powder, the stirring rotation speed and shape of the apparatus, the composition of the surface treatment agent, and the retention time and the like.

(Heating Treatment Temperature and Time)

The water-absorbing resin powder to which the surface-crosslinking agent solution was added at the above humidifying and mixing step undergoes the heating treatment to execute the surface-crosslinking reaction in this heat treatment step. After that, cooling treatment (cooling step) is carried out if necessary. The heating temperature at the heat treatment step is not limited as long as the surface-crosslinking reaction is conducted promptly, it is preferably 70 to 300° C., more preferably 120 to 250° C., and still more preferably 150 to 250° C., and the heating time is preferably in a range of 1 minute to 2 hours. The heat treatment is carried out by the above mentioned drier or heating furnace. The present invention can provide a water-absorbing resin powder with high whiteness even by controlling the heating temperature and the heating time within the above range.

(Periodical Shielding)

In this specification, "periodical shielding" means intermittent (On-Off) conveying of the water-absorbing resin by installation of a periodically shielding apparatus between continuous apparatuses (e.g., between a humidifying and mixing apparatus and a heating treatment apparatus, between a heating treatment apparatus and a cooling apparatus, or between a cooling apparatus and a classification apparatus and the like). That is, from the viewpoint of stabilization or improvement of physical properties by surface-crosslinking, between the respective steps of the surface-crosslinking step or between the surface-crosslinking step and the classification step, periodical shielding is preferably carried out. The interval of the periodical shielding is preferably 0.001 to 5 minutes, more preferably 0.01 to 1 minute, and still more preferably 0.05 to 0.5 minutes.

In the case where no periodic shielding is carried out, the physical properties of a water-absorbing resin powder to be obtained may possibly be deteriorated. The shielding ratio (the ratio of the time when the water-absorbing resin is shielded from the continuous apparatus installed downstream) is preferably in a range of 5 to 95%, more preferably 10 to 90%, still more preferably 20 to 80%, particularly preferably 30 to 70%, and most preferably 40 to 60%, from the viewpoint of stabilization of the physical properties (standard deviation). It is sufficient that the water-absorbing resin (e.g., 1 t/hr or more) is fed to the above mentioned continuous apparatus with the periodical shielding.

For example, in the case of a rotary valve is used to conducting the periodical shielding, the shielding interval is defined as the reciprocal number [minute] of the rotation speed [rpm], and the shielding ratio is defined as a value calculated by dividing the theoretical rotation speed (rpm) per one minute of the rotary valve needed for discharging a humidified mixture (wet powder; a mixture of the water-absorbing resin and the surface-crosslinking agent solution) to be supplied to the humidifying and mixing apparatus (theoretical rotation speed is obtained from the volume flow rate calculated from the volume per one rotation of the rotary valve, the mass flow rate of the mixture to be discharged, and the bulk specific gravity) by actual rotation speed (rpm) of the rotary valve, and multiplying the calculated value by 100.

The amount of the water-absorbing resin retained in the periodical shielding is preferably 0 to 2% and more preferably exceeding 0 and to 1% or lower relative to the treatment amount. The volume per one rotation of the rotary valve may be determined properly and it is preferably 0.1 to 0.001 [$m^3$/lev (one rotation)], more preferably 0.2 to 0.002 [$m^3$/lev], and still more preferably 0.2 to 0.01 [$m^3$/lev].

When the continuous apparatuses (the humidifying and mixing apparatus, the heating treatment apparatus, and the cooling apparatus) are joined, the distance from the outlet of one apparatus and the inlet of another apparatus is preferably 10 m or shorter, more preferably 5 m or shorter, still more preferably 1 m or shorter, and particularly preferably 0.5 m or shorter, and more preferably the apparatuses are joined up and down. In the case where the periodic shielding is carried out the periodically shielding apparatus can be installed between the apparatuses. The lower limit of the distance of the continuous apparatuses may be determined properly in accordance with the sizes of the apparatuses or in a range in which a shielding apparatus described below can be housed. In the case where the distance of the continuous apparatuses is too large or the apparatuses are not joined up and down, the physical properties of a water-absorbing resin powder to be obtained may possibly be deteriorated. In the case of joining the continuous apparatuses up and down, for example, the humidifying and mixing apparatus, the heating treatment apparatus, and the cooling apparatus may be joined up and down in this order.

The periodically shielding apparatus used in the present invention, a gate, a valve, a damper, a rotary feeder, a table feeder, or the like is exemplified. Examples of the gate to be employed include a slide gate, a roller gate, a tainter gate, a radial gate, a flap gate, a rolling gate, and a rubber gate etc. Examples of the valve to be employed include a Howell-Bunger (fixed cone dispersion) valve, a hollow jet valve (a movable cone dispersion valve), a jet flow valve, a butterfly valve, a gate valve (a partition valve), an orifice valve, a rotary valve (a valve for opening or closing by rotating a cylinder), and a Johnson valve (a valve for opening or closing by moving a conical valve body back and forth) and the like. Among them, valve is preferably used and rotary valve is more preferably used. The size (it refers to diameter: however, in the case where the cross section is other than a circular shape, it is converted into the diameter of a circle with the same surface area) of the valve may be selected properly and it is preferably, for example, 1 to 100 cm in diameter and more preferably 10 to 50 cm in diameter.

A treatment amount of these periodically shielding apparatus is preferably less than 100%, more preferably 5 to 95%, still more preferably 10 to 90% and particularly preferably 20 to 80% relative to the maximum treatment amount (the maximum amount of a substance which can be passed through the periodical shielding apparatus per unit time). In the case where the treatment amount of the periodical shielding apparatus is out of the above-mentioned range, the physical properties may possibly be deteriorated and the performance may possibly become unstable.

In the case where a rotary shielding apparatus such as a rotary valve is used, the rotation speed thereof may be determined properly and it is preferably 1 to 50000 rpm, more preferably 10 to 3000 rpm, and still more preferably 50 to 500 rpm. The treatment performance of the periodical shielding apparatus may be determined properly and it is preferably 0.01 to 20 [t/hr] and more preferably 0.1 to 5 [t/hr].

(2-5-3) Cooling Step

The cooling step in the present invention is a step carried out after the heating treatment step for the purpose of stopping the surface-crosslinking reaction or controlling the temperature of the water-absorbing resin powder and the like, and the cooling step is preferably carried out to cool the water-absorbing resin powder after surface-crosslinking by a dehydration-reactive surface-crosslinking agent containing a polyhydric alcohol compound, an alkylene carbonate compound, and an oxazolidinone compound which requires a reaction at the above-mentioned high temperature.

The cooling step in the present invention is for controlling the reaction of the surface-crosslinking agent by stirring and cooling treatment under air current. Therefore, dew formation of water (steam generated by heating) generated by a surface-crosslinking reaction or the like and agglomeration of resin particles caused by the dew formation are prevented and deterioration of production stability and physical properties of the water-absorbing resin can be prevented and therefore, the cooling step is preferable.

(Cooling Apparatus)

A cooling apparatus to be used in the cooling step is not particularly limited. Already mentioned heating treatment apparatus for the heat treatment step can be used. Also, the same type apparatus as an apparatus exemplified in the above mentioned patent document 41 etc can be used. For example a stirring cooling apparatus having two rotary shafts having cooling water is flow inside an inner wall and/or other heat transfer surface and the like. More specifically, various types of cooling apparatuses are exemplified equipped with aeration feature of airflow such as a fluidized bed cooling apparatus, air current cooling apparatus, a groove type mixing and cooling apparatus, a rotary cooling apparatus, a disk cooling apparatus, a paddle type cooling apparatus, a vibrating and fluidizing cooling apparatus, and a paddle cooling apparatus using air current in combination. That is, a transverse type continuous stirring apparatus having a feeding inlet and a discharge outlet for the water-absorbing resin powder, a stirring means having one or more rotary shafts equipped with a plurality of stirring blades, and a cooling means is preferably used in the cooling apparatus of the cooling step.

Also, as the above mentioned cooling apparatus, an apparatus having mechanical stirring (which can be combined with stirring by airflow) as exemplified in patent document 41 and the like or an apparatus which can stir and mix by combining vibrating stirring and airflow stirring is preferably used as the cooling apparatus.

The temperature of the cooling water which is flow inside an inner wall and/or other heat transfer surface of the above mentioned cooling apparatus is controlled to the temperature of surface-crosslinking reaction, that is, controlled to the temperature lower than the heat treatment temperature preferably, and more preferably 25° C. or more and less than 80° C. By controlling the cooling water temperature within the range above, thereby surface-crosslinking reaction is controlled and physical properties of the water-absorbing resin powder can be improved.

As an cooling apparatus above, same type apparatus as the transverse type continuous stirring apparatus used in the heat treatment step is preferably used and the stirring power index is also the same as the heat treatment step. to be more precise, it is preferably to set to 3 to 15 [W·hr/kg], more preferably to set to 4 to 13 [W·hr/kg], still more preferably to set to 5 to 11 [W·hr/kg], particularly preferably to set to 5 to 10 [W·hr/kg], and most preferably to set to 5 to 9 [W·hr/kg].

The cooling apparatus to be used for the cooling step in the present invention is joined to the heating treatment apparatus to carry out cooling of the surface-crosslinked water-absorbing resin powder to a temperature in the range of room temperature to about 60° C. after execution of the surface treatment. The temperature of the water-absorbing resin powder at the time of supply to the cooling step is in the range of (heating treatment temperature) to (heating treatment temperature −30° C.) and may vary according to the ambient temperature, the joining distance, and the like.

The temperature of the water-absorbing resin powder supplied to the cooling apparatus has a temperature gradient in the cooling apparatus. The temperature is the heating treatment temperature or a temperature close thereto in the periphery of the inlet of the cooling apparatus and is almost a planned cooling temperature in the periphery of the outlet of the cooling apparatus. The outlet temperature may be properly set so as to be an outlet temperature as desired, although being affected by the coolant temperature, heat conduction surface area of the cooling apparatus, retention time, and the like.

In the present invention, in order to achieve the object, it is desired to cool the water-absorbing resin powder after surface-crosslinking, which has been taken out of the heating treatment apparatus, within preferably 1 minute, more preferably within 30 seconds after being taken out and therefore, the heating treatment apparatus and the cooling apparatus are substantially joined together. "Substantially joined" means that the distance between the apparatuses is 0 to 10 m, preferably 0 to 5 m, more preferably 0 to 1 m, and particularly preferably 0 to 0.5 m. From the viewpoint of the physical properties and productivity, in the case the temperature of the water-absorbing resin powder at the start of cooling is 150 to 250° C., cooling is desirably carried out to adjust the temperature after cooling to be preferably 40 to 100° C., more preferably 50 to 90° C., and still more preferably 50 to 80° C.

(Stirring and Cooling Treatment)

In the present invention, the "stirring and cooling treatment" means stirring and cooling the water-absorbing resin powder by mixing the powder by mechanical stirring (combination with air current stirring is also possible), or stirring and mixing the powder by vibration stirring and air current stirring in combination. At this time, the water-absorbing resin powder is cooled in a continuous or batch manner in a cooling apparatus (a mixing apparatus) having a function of forcible cooling and subjected to stirring and cooling treatment under air current as an indispensable condition.

(Mechanical Stirring)

A cooling apparatus to be used in the cooling step of the present invention, an stirring apparatus capable of ventilating air current and having a function as a cooling apparatus may be used. Examples of the cooling apparatus include apparatuses having a horizontal rotary shaft and an apparatus rotating by itself (various kinds of stirring apparatuses such as a horizontal cylindrical type apparatus, an inclined cylindrical type apparatus, a V-formed type apparatus, a double conical type apparatus, a cubic type apparatus, an S-formed type apparatus, and a continuously V-shaped type apparatus), and apparatuses having a horizontal rotary shaft and a fixed apparatus (various kinds of stirring apparatuses such as a ribbon type apparatus, a screw type apparatus, a conical screw type apparatus, a groove stirring type apparatus, a high speed fluidization type apparatus, a rotary disk type apparatus, a Muller type apparatus, a paddle type apparatus, a rotary type apparatus, and a disk type apparatus) and the like. The direction of the air current is not particularly limited as long as the object is achieved and may be up and down and right and left and the like. Those preferable are container-fixed type cooling apparatuses equipped with rotating stirring blades for stirring the water-absorbing resin powder and capable of ventilating air current and these apparatuses may be used in a continuous or batch manner, preferably in a continuous manner. These apparatuses indispensable have to have an upper space sufficient for ventilating air current at a part other than a fixed container part for stirring and it is preferable to operate the apparatuses in the range of 10 to 100% of a filling ratio of the fixed container volume with the water-absorbing resin.

(Vibration Stirring)

In this specification, "vibration stirring" means stirring operation for applying mechanical vibrations to the water-absorbing resin powder and causing three-dimensional movements of the water-absorbing resin powder by the vibrations.

The vibration stirring can be done by using an eccentric motor (a vibration motor), an electromagnet, or the like. Since control of the vibrating angle, vibration frequency, and strokes is easy, an eccentric motor is preferable.

It is possible to make the water-absorbing resin powder move up and down or move in parallel in the transverse direction in accordance with the direction of the applied vibrations (vibrating angle). With respect to the vibration direction, the condition may be set properly for the apparatus.

In the stirring by vibrations, in order to promote discharge out of the apparatus, the vibrating angle is set to be preferably more than 0° and less than 90°, more preferably more than 30° and less than 70°. In the case the vibrating angle is out of the above-mentioned range, problems occur such as the stirring of the water-absorbing resin powder by vibrations may be done but discharge is not done, or the necessary retention time cannot be obtained because of too much discharge and the like.

(Air Current Stirring)

In this specification, "air current stirring" means stirring operation by applying air current to the water-absorbing resin powder and causing three-dimensional movements of the water-absorbing resin powder by the air current.

The direction of the air current is not particularly limited, and it is preferable to apply air current against the water-absorbing resin powder from a lower side. In the case air current is applied from a lower side, the air velocity may be selected properly if necessary to be not less than the final speed of the water-absorbing resin powder to be stirred in the air current. The "final speed" means a falling speed at which the acceleration factor becomes zero in a motion equation (taking fluid resistance into consideration) relevant to free fall in a fluid, that is, the speed which is constant, and the final speed is higher as with the increase of the particle diameter of particles. In the case of stirring at a constant air velocity, particles with a smaller particle diameter fiercely move and particles with a larger particle diameter move moderately.

The final speed may be determined based on the motion equation of the particles in which the fluid resistance is taken into consideration by numerical analysis using the particle diameter, density, air current temperature, and viscosity, or may be determined properly by carrying out actual experiments. The "air velocity" is generally air velocity called as superficial velocity, which is the air velocity in a cross section perpendicular to the flow direction of the air current: that is, the airflow quantity per cross sectional surface area of the cooling apparatus.

In the air current stirring in the present invention, the air velocity generally has the final speed of the water-absorbing resin powder having the maximum particle diameter as the upper limit and is preferably the final speed or lower of the water-absorbing resin powder having the weight average particle diameter and more preferably 50% or lower of the final speed of the water-absorbing resin powder having the weight average particle diameter.

Concretely, in general, the maximum air velocity is about 5 [m/s], and in the case the weight average particle diameter is about 400 μm, it is preferably 2.5 [m/s] or lower and more preferably 1.3 [m/s] or lower. Problems occur such as in the case the air velocity is too high, the water-absorbing resin powder is scattered out of the apparatus and on the other hand, if the air velocity is extremely low, stirring cannot be carried out and the like.

(Vibrating and Fluidizing Cooling Apparatus)

An example of a cooling apparatus capable of employing the vibration stirring and air current stirring in combination is a vibrating and fluidizing cooling apparatus. This apparatus is an apparatus for cooling the water-absorbing resin powder while fluidizing the water-absorbing resin powder by employing vibration stirring and air current stirring in combination. Concretely examples thereof include a continuous vibration type drying and cooling apparatus manufactured by Tamagawa Machinery Co. Ltd., a vibrating drying/cooling apparatus manufactured by Dalton Co., Ltd, and a vibrating type fluidized-bed drying/cooling apparatus manufactured by Tsukishima Kikai Co., Ltd and the like. In these apparatuses, a heat transfer tube such as a cooling tube may be installed together with the stirring in the inside for promoting the cooling.

The vibrating and fluidizing cooling apparatus fluidizes the water-absorbing resin powder by vibration stirring and air current stirring and at this time, the water-absorbing resin powder is cooled by the air current introduced into the cooling apparatus. The vibration frequency of the vibrating and fluidizing cooling apparatus is generally about 1000 cps (count per sec) and the stroke is about 3 mm.

Examples of the cooling apparatus in which mechanical stirring and air current stirring are employed in combination include Frigomix manufactured by Nisshin Engineering Inc., and a rotary disk type drying/cooling apparatus equipped with a fluidized-bed manufactured by Tsukishima Kikai Co., Ltd. And the like, but the cooling apparatus is not limited to these examples.

The cooling apparatus in which mechanical stirring and air current stirring are employed in combination stirs the water-absorbing resin powder by mechanical stirring and air current stirring and at this time, cools the water-absorbing resin powder by transmitted heat between the inner surface of the cooling apparatus and/or the rotary stirring shaft and the air current introduced. The rotating speed of the rotary stirring shaft of the cooling apparatus is preferably 1 to 1000 rpm, more preferably 3 to 500 rpm, and still more preferably 5 rpm or more and less than 100 rpm. The air velocity of the air current is preferably 0.01 [m/s] or higher, more preferably 0.1 to 10 [m/s], and still more preferably 0.2 to 5 [m/s] as a linear speed (the airflow quantity per cross sectional surface area of the container).

(Effects)

In the present invention, the water-absorbing resin powder is stirred and cooled under air current and at this time, it is preferable to simultaneously carry out the cooling treatment of the water-absorbing resin powder and removal of at least a portion of the water-absorbing resin particles and/or remaining surface-crosslinking agent. It is preferable to remove the water-absorbing resin particles and/or remaining surface-crosslinking agent by supplying excess air current more than the amount necessary for merely fluidizing the water-absorbing resin powder. A continuously transferring fluidized-bed type cooling apparatus into which excess air current is introduced from the bottom part is also usable as a cooling apparatus for the present invention.

That is, a cooling apparatus which carries out mixing by mechanical stirring (optionally combined with air current stirring) under air current or which carries out stirring and mixing by combining vibration stirring and air current stirring may be used for removing at least a portion of the water-absorbing resin particles and/or remaining surface-crosslinking agent by air current. The cooling apparatus is not particularly limited as long as it has a configuration which enables sufficient ventilation of air current and cooling, and in addition to the stirring and cooling apparatus, a continuously transferring fluidized-bed type cooling apparatus is also usable as the cooling apparatus.

(Low Speed Stirring Type Cooling Apparatus)

The stirring and cooling apparatus to be used for stirring and cooling treatment in the present invention preferably has a rotary stirring shaft. Examples of the rotary stirring shaft include uniaxial or multi-axial (biaxial, triaxial, etc.) ones and these shafts generally have rotary stirring blades (paddles). In the inside of the stirring and cooling apparatus, the water-absorbing resin powder is rotated and stirred and fluidized by piston flow while substantially being filled or deposited in a lower part and at this time, the water-absorbing resin powder is cooled (quenched) by the heat conduction with the cooling apparatus inner surface (inner wall surface) and/or the rotary stirring shaft.

The stirring and cooling apparatus is a low speed stirring type cooling apparatus having a plurality of paddles and specific examples thereof include a CD drier manufactured by KURIMOTO LTD. and an inclined disk type drier manufactured by Tsukishima Kikai Co., Ltd. and the like.

The rotating speed of the rotary stirring shaft of the low speed stirring type cooling apparatus is generally less than 100 rpm (Revolutions per minute), preferably 50 rpm or less, and more preferably 5 to 30 rpm. Although it depends on the paddle diameter, it is preferable to satisfy the above-mentioned rotating speed and to control the peripheral velocity of the outermost circumference of the paddles to be 5 [m/s] or less.

If the rotating speed is less than 5 rpm, no sufficient cooling effect can be caused. In the case the rotating speed exceeds 100 rpm, the water-absorbing resin powder is damaged due to the friction or mechanical breakage and the physical properties may be lowered.

In the case the water-absorbing resin powder is supplied continuously to the low speed stirring type cooling apparatus under air current, the arrangement of the cooling apparatus is not particularly limited, and the apparatus may be installed vertically (the water-absorbing resin powder is moved downward from an upper side) or transversely (the water-absorbing resin powder is moved in the transverse direction). From the viewpoint of physical properties of the water-absorbing resin powder to be obtained, the apparatus is preferably installed transversely and more preferably installed facing downward slantingly. Owing to the downward slant, piston flowability in continuous operation of the water-absorbing resin powder is improved and it becomes easy to exchange products.

The downward slanting angle may be determined properly and the slant is preferably downward at 0.1 to 30°, more preferably 1 to 20°, and still more preferably 3 to 15° to the horizontal direction in the proceeding direction of the water-absorbing resin powder. In the case there is no downward slant, stable supply of the heated water-absorbing resin powder becomes difficult and it sometimes result in deterioration of physical properties and inferiority of stability.

The filling state of the water-absorbing resin powder in the inside of the low speed stirring type cooling apparatus may be determined properly and the water-absorbing resin powder is generally layered owing to the self weight and the height of the layer is preferably 1 to 100 cm, more preferably 5 to 80 cm, and still more preferably 10 to 50 cm. The water-absorbing resin powder is filled in such a state and preferably stirred and rotated under air current.

In the present invention, same as described above, a downwardly slanted heating treatment apparatus can be used in the heating treatment step. That is, not only the above-mentioned slanted cooling apparatus but also similar slant is preferably employed also for the heating treatment step before cooling to improve the physical properties of the water-absorbing resin powder of the present invention.

(Pressure Reduction)

In the present invention, it is preferable to carry out cooling treatment in a state where the inside pressure of the apparatus is slightly reduced. The "slightly reduced pressure" means that the pressure is lower than the atmospheric pressure and the pressure difference from the atmospheric pressure is expressed as a positive (plus) value. For example, in the case the atmospheric pressure is standard atmospheric pressure (101.3 kPa) and the inside pressure of the apparatus is 91.3 kPa, it means "a degree of pressure reduction of 10 kPa". In the case the inside pressure of the apparatus is not reduced, the water-absorbing resin powder is sometimes discharged through an intake opening of the apparatus and it is not preferable. Dust (ultrafine particles of the water-absorbing resin or inorganic fine particles used if necessary) can be removed from the water-absorbing resin by slightly reducing the pressure in the apparatus and it is preferable also from the viewpoint of decrease of dust.

The lower limit of the degree of pressure reduction is preferably over 0 kPa, more preferably 0.01 kPa or higher, and still more preferably 0.05 kPa or higher from the viewpoint of increasing the effect of the pressure reduction. The upper limit of the degree of pressure reduction is preferably 10 kPa or lower, more preferably 8 kPa or lower, still more preferably 5 kPa or lower, and particularly preferably 2 kPa or lower from the viewpoint of suppression of the powder from leaping in the system and saving of the cost. If the pressure is reduced to an excess extent, not only the dust but also the water-absorbing resin powder is discharged outside and it undesirably results in decrease of the yield. The desirable range of the degree of pressure reduction can be selected arbitrarily between the above-mentioned lower limit and upper limit.

A method for slightly decreasing the pressure in the apparatus is not particularly limited and may be a method of forming an intake opening in one side of a cooling apparatus and suctioning air (reducing the pressure) and a method of forming an air-exhaust opening in one side of a cooling apparatus and blowing air (pressurizing) and the like in the case of, for example, stirring and cooling. These intake opening and air-exhaust opening may also be used as a discharge opening and an injection opening of the water-absorbing resin powder and are preferably formed separately.

(2-6) Water Addition Step

The water addition step means a step of adding water to the water-absorbing resin powder in at least one stage of after surface-crosslinking, during surface-crosslinking, and before surface-crosslinking in various manners of adding water, adding a solution or a dispersion containing water and an additive, or the like to the water-absorbing resin powder, from the viewpoint of increase of the moisture content of the water-absorbing resin powder, prevention of powdering, and mixing of additives (e.g., a surface-crosslinking agent and the like) and the like. Preferably, the water-absorbing resin powder after the surface-crosslinking can be cooled or the water-absorbing resin powder can be modified and the like by adding water after the surface-crosslinking step. Water addition may be carried out by mixing the water-absorbing resin powder with water by a mixing apparatus (e.g., a humidifying and mixing apparatus, a heating treatment apparatus, or a cooling apparatus and the like) and the like.

(Water)

"Water" in the water addition step in the present invention is not limited to water and may contain other solvent and additives (in the present invention, as described later, sometimes referred to as a "water-based liquid"). The ratio of water in a water-based liquid is determined to be within a range where water is present as main component and preferably in a range of 50 to 100 wt. % and more preferably in a range of 70 to 100 wt. %. The form of the water in the water addition step may be an aqueous solution or an aqueous dispersion with the ratio in the above-mentioned range and preferably an aqueous solution.

A solvent to be used optionally with water is preferably an organic solvent and examples thereof include lower alcohols (monohydric alcohols and polyhydric alcohols) and lower ketones and the like, and preferably C1 to C6, more preferably about C2 to C5 hydrophilic organic solvents.

In order to make the water-absorbing resin powder of the present invention exhibit an additional function, various kinds of additives may be dissolved or dispersed. Examples of the additives include arbitrary compounds selected from deodorants, antibacterial agents, coloring agents, chelating agents, inorganic salts, acids, alkalis, metal salts, surfactants, organic surface-crosslinking agents, inorganic crosslinking agents, and the like. More concretely, examples thereof include sulfurous acid salts such as sodium hydrogen sulfite (SBS) for decreasing remaining monomers, organic or inorganic bases for adjusting water absorption speed, organic acids or inorganic acids, monovalent metal salts or polyvalent metal salts (aluminum sulfate), deodorants for providing a deodorization function, coloring agents for adding visual values, and various kinds of chelating agents for increasing urea resistance and the like. The concentration (total use amount) of the additives in the water-based liquid is preferably 0.01 to 50 wt. %, more preferably 0.1 to 40 wt. %, and still more preferably 1 to 30 wt. %. The additives to be used in combination with water may be left as they are in the water-absorbing resin powder after mixing in form of a water-absorbing resin composition, may be reacted with the water-absorbing resin powder like a crosslinking agent, an acid, or an alkali, or may be dried or removed from the water-absorbing resin powder like a volatile solvent.

(In the Case of Surface-Crosslinking Agent)

In the humidifying and mixing step, in the case a solution containing a surface-crosslinking agent and water is used, since excess water is removed from the water-absorbing resin powder by carrying out heating treatment immediately after humidifying and mixing the water-absorbing resin powder with the solution, the probability that unsteady agglomerates are formed by agglomeration in a heating treatment apparatus is lessened and it is not necessarily required to carry out the second classification step (separation step) described later immediately after the surface-crosslinking (heating treatment step).

Consequently, the present invention is preferably applicable to the case of involving the water addition step after surface-crosslinking, and still more preferably, water addition in the humidifying and mixing step before surface-crosslinking and/or water addition in the cooling step after surface-crosslinking is carried out in combination.

(Water Temperature, Addition Amount, etc.)

The temperature of the water-based liquid to be added is preferably 0° C. to lower than boiling point and more preferably 10 to 50° C. The addition amount of the water-based liquid is preferably 0.01 to 50 parts by weight, more preferably 0.01 to 30 parts by weight, still more preferably 0.1 to 10 parts by weight and particularly preferably 0.5 to 8 parts by weight relative to 100 parts by weight of the water-absorbing resin powder.

(Target of Moisture Content)

Target of moisture content (defined in ERT 420.02-02) of the water-absorbing resin powder is preferably 0.2 wt. % or more, more preferably 1 to 15 wt. %, still more preferably 2 to 10 wt. %, and particularly preferably 3 to 8 wt. %. It is possible to adjust the moisture content in the stage of a final product; however, if the moisture content before the second classification step is too high, the efficiency tends to be deteriorated and it is desirable to adjust the moisture content before the second classification step.

(Water Addition Method)

An apparatus for adding the water-based liquid to the water-absorbing resin powder is not particularly limited as long as it is a spraying apparatus suitable for the purpose and it is preferably an apparatus capable of evenly spraying the water-based liquid to a narrow area. Preferable examples thereof include a flat spray, a mono-component fluid type or bi-component fluid type spray having a spray pattern of hollow cone or full cone, and a further preferable example is a narrow-angle spray for spraying to a narrow region.

At the time of spraying the water-based liquid, the size of the droplets is not particularly limited, and it is preferably 10 to 1000 μm as the volume average, and more preferably the optimum size is 50 to 500 μm as the volume average. In the case the size of the droplets exceeds the above-mentioned range, the moisture content in the water-absorbing resin powder becomes uneven and the resin powder absorbing a large quantity of water forms "lumps" and possibly clogs the apparatus. In the case the size of the droplets is less than 10 μm, the sprayed water does not effectively adhere to the water-absorbing resin powder and may possibly be scattered and discharged outside of the apparatus or may form dew condensation water and thus it is not preferable.

(Timing of Water Addition)

In the present invention, the timing of water addition is not particularly limited and may be any timing, before surface-crosslinking, after surface-crosslinking, or during surface-crosslinking. Preferably, water is added to the water-absorbing resin powder in a water addition step provided in the cooling step after surface-crosslinking. For example, water before the surface-crosslinking (before the surface-crosslinking reaction) is used as a solvent for the surface-crosslinking agent, water during the surface-crosslinking or after the surface-crosslinking is used for increasing the moisture content of the surface-crosslinked water-absorbing resin powder or as a solvent for various kinds of additives to be added to the water-absorbing resin powder.

Preferably, water is added as a solvent for a surface-crosslinking agent before surface-crosslinking and water is also added after surface-crosslinking. It is also a preferable embodiment that the water addition step is carried out for the water-absorbing resin powder after the surface-crosslinking. In addition, in the case the surface-crosslinking is carried out a plurality of times in the present invention, for example, when the second surface-crosslinking is carried out with an ion bonding surface-crosslinking agent after surface-crosslinking with a covalent bond-forming surface-crosslinking agent, the second surface-crosslinking with an aqueous solution or aqueous dispersion containing the ion bonding surface-crosslinking agent corresponds to water addition "after" the (initial) surface-crosslinking.

As described above, it is preferable to add water in the water addition step after the surface-crosslinking, and it is particularly preferable to add water simultaneously with cooling in the cooling step. At this time, a low speed stirring type cooling apparatus is preferably used (that is, water addition can be carried out using the low speed stirring type cooling apparatus to be used in the cooling step). An apparatus to be used as the cooling apparatus may be a transverse type continuous stirring apparatus having a feeding inlet and a discharge outlet for the water-absorbing resin powder, a stirring means having one or more rotary shafts equipped with a plurality of stirring blades, and a cooling means. In the surface-crosslinking step, it is preferable that a continuous heating treatment apparatus (heating treatment step) and a continuous cooling apparatus (cooling step) are joined and the above-mentioned periodical shielding is carried out between the heating treatment apparatus and the cooling apparatus.

In the water addition step after the surface-crosslinking, especially in the cooling step, the water-absorbing resin is agglomerated by adding water in the site where the temperature of the water-absorbing resin powder is 40 to 100° C. to decrease the dust content and dust generation.

In the above-mentioned case, the temperature of the water-absorbing resin powder before starting cooling generally exceeds 100° C. and it is lowered by the cooling treatment preferably to 100° C. or lower, more preferably to 90° C. or lower, and still more preferably to 80° C. or lower. The cooling treatment is preferably the above-mentioned cooling under air current and more preferably stirring and cooling by air current.

Water addition to the water-absorbing resin powder is not endothermic but exothermic. The water addition to the water-absorbing resin powder causes an exothermic reaction by heat of hydration and the water-absorbing resin powder generates heat; however, the water-absorbing resin powder is concurrently forcibly cooled in the cooling apparatus, so that the surface property of the water-absorbing resin powder is changed and the water-absorbing resin powder to be obtained is further improved in the physical properties. Additionally, dust generation is suppressed and it is supposed that the form of the water-absorbing resin powder becomes better.

The specified addition method of the water-based liquid gives the water-absorbing resin powder having a controlled weight average particle diameter (D50) of preferably 200 to 600 μm, more preferably 300 to 500 μm, and a controlled content of fine particles with a particle diameter 150 μm or less of preferably 5 wt. % or less, more preferably 3 wt. % or less, and still more preferably 1 wt. % or less.

The addition of the water-based liquid in the cooling step is carried out in the site where the temperature of the water-absorbing resin powder is preferably 40 to 100° C., more preferably 50 to 90° C., and still more preferably 60 to 80° C. The "site" means a region (zone) having a specified temperature, for example, in the case the temperature is continuously changing (decreasing) in a continuous flow type production (cooling) apparatus for the water-absorbing resin powder.

In addition, if the water-based liquid is added in a site where the temperature of the water-absorbing resin powder is lower than 40° C., the water-absorbing resin is agglomerated and clogs the outlet of the cooling apparatus, or the water-absorbing resin adheres to the heat transfer surface of the cooling apparatus to lower the heat transfer efficiency to substantially deteriorate the cooling efficiency, or at the time of breakage of the agglomerates, the water-absorbing resin itself composing the agglomerates is damaged to deteriorate the physical properties. If the water-based liquid is added in a site where the temperature exceeds 100° C., a low boiling point component in the added water-based liquid, for example, water, is evaporated and thus not only the water-based liquid cannot be added effectively to the water-absorbing resin powder but also dewdrops are formed in the cooling apparatus due to the evaporated water, and agglomerates are formed due to the dewdrops and the outlet of the cooling apparatus is clogged with the agglomerates to inhibit stable operation, or the water-absorbing resin adheres to the heat transfer surface of the cooling apparatus to lower the heat transfer efficiency to substantially deteriorate the cooling efficiency, or deteriorate the physical properties of the water-absorbing resin.

In the present invention, it is preferable to add the water-based liquid in a site at a temperature in the above-mentioned temperature range. A method for finding these preferable temperature regions in the cooling apparatus may be a method for actually measuring the temperature under a set operation condition, or assuming a counter-flow or parallel flow contact type heat exchanger from the temperature of the water-absorbing resin powder at the inlet and the outlet of the cooling apparatus, specific heat of the water-absorbing resin, supply speed, and the temperature of the coolant at the inlet and the outlet and the like; calculating the comprehensive heat transfer coefficient; producing a function of the heat transfer surface area with the distance in the flow direction; and calculating the temperature by numerical analysis.

In the case water is added in the cooling step, the cooling step and water addition are carried out integrally as described above. To carry out integrally does not mean that cooling and water addition are started simultaneously but that water is added at the above-mentioned desired timing in the cooling step (particularly, in the cooling apparatus).

In the case water is added in the cooling step, the agglomerates, particularly unsteady agglomerates, may be selectively removed by carrying out the second classification step (separation step) after the cooling step and by the time the other steps are carried out.

(Unsteady Agglomerates)

Conventionally, in the water-absorbing resin production process, at the time of obtaining a granulated material (the one obtained by adding water or the like to the water-absorbing resin particles and granulating the resulting particles), the produced agglomerates with undesired particle sizes have been considered to be a problem. Similarly, in the present invention, the inventors have noted the unsteady agglomerates produced at the time of adding water and completed the present invention. The "unsteady agglomerates" defined in the present invention are neither granules nor relatively small agglomerates produced continuously in the continuous production but coarse agglomerates out of the standard and produced unsteadily. "Unsteadily" means that the frequency and interval of the agglomerate formation are unsteady and the interval can be assumed to be 10 seconds or more, 30 seconds or more, 1 minute or more, 10 minutes or more, 1 hour or more, 5 hours or more, 24 hours or more, or 120 hours or more and agglomerate formation occurs at random. Consequently, the temporal condition for specifying the unsteady agglomerates is not particularly limited.

The reason for irregular formation of the unsteady agglomerates is not particularly specified but supposedly attributed to that the agglomerates adhering to the inner wall or the like of an apparatus are coarsened and isolated and the like by changing the amount of added water or changing the mixing conditions. The present invention is preferably applied to the case the unsteady agglomerates are specifically adhesive agglomerates separated from the inner wall or the like of an apparatus. As described above, the adhesive agglomerates are formed in a way that agglomerates adhering to the inner wall or the like of an apparatus are coarsened and separated because of their weights and the like. Consequently, the adhesive agglomerates are different in the size from relatively small agglomerates formed commonly in the production process. In the explanation below, unless otherwise specified, relatively small agglomerates and unsteady agglomerates are collectively named as "agglomerates".

The size and shape of the unsteady agglomerates are not particularly limited since they are formed due to various factors as described above, but the size is generally 10 mm or higher, preferably 20 mm or higher, and more preferably 50 mm or higher as measured by standard sieves. The upper limit is determined in accordance with the size of the apparatus to be used and it may be, for example, 1 m, 50 cm, or 10 cm. The unsteady agglomerates are lumps of a resin remaining on a sieve and concretely, agglomerates with a size 10 mm or higher mean agglomerates which do not pass through meshes of 10 mm square and so forth.

The moisture content of the unsteady agglomerates is also not particularly limited and determined in accordance with the size and retention time and the like in an apparatus. In general, the unsteady agglomerates form hydrates and for example, the content is preferably 1 to 50 wt. %, more preferably 2 to 30 wt. %, and particularly preferably 3 to 20 wt. %.

(2-7) Second Classification Step (Separation Step)

The process for producing the water-absorbing resin powder of the present invention involves a step (second classification step) of separating the agglomerates (particularly unsteady agglomerates) of the water-absorbing resin powder formed in the surface-crosslinking step and particularly in the water addition step. Separation and removal of the agglomerates in this step makes it possible to produce a high quality water-absorbing resin powder efficiently for a long time. In the second separation step, the agglomerates or the like are separated from the water-absorbing resin powder, which is an intended product, by classification.

The water-absorbing resin powder of the present invention has an increased moisture content in the surface layer part by adding the water-based liquid and when the moisture content is in a range of 30 to 50 wt. %, the viscosity sharply increases. The particles of the hydrated granular water-absorbing resin powder adhere to each other and are easy to finally form agglomerates. The formed agglomerates are further agglomerated because of the high adhesiveness and adhere to the inner wall and the like of an apparatus and grow to be large. Because of the high moisture content, the agglomerates are relatively heavier than the water-absorbing resin powder.

In the process for producing a water-absorbing resin powder of the present invention, the inventors have noted the above-mentioned characteristics of the agglomerates and have utilized the characteristic that the agglomerates are relatively heavier than the water-absorbing resin powder to easily separate the agglomerates based on the size and weight by sieving classification using a mesh sieve or a plate sieve and the like, air current classification, or the like.

In the present invention, as described above, it is preferable to employ, as the means for separating the agglomerates, sieving classification by which particles can be separated by a given size using sieve and the like. At this time, unless it leads to considerable loss, the water-absorbing resin powder (powder with a particle diameter of, for example, less than 1 mm) may be classified and separated together with the agglomerates and further the separated agglomerates and the water-absorbing resin powder may be classified again.

Conventionally, in the production process of a water-absorbing resin powder, after the final crushing step, for example, after the crushing step carried out after the conveying step, classification (in this specification, corresponding to the third classification step described later, and hereinafter, the classification step carried out after the conveying step is referred to as the "third classification step" and distinguished from the first classification step and the second classification step) may be carried out. However, the second classification step (separation step) in the process for producing a water-absorbing resin powder of the present invention is a unique step and fundamentally different from the conventional third classification step.

That is, the conventional third classification step is a step for merely selecting those which are insufficiently crushed but on the other hand, the second classification step (separation step) in the present invention is a step for separating agglomerates, particularly unsteady agglomerates, formed by water addition. In the second classification step (separation step), employment of the classification means makes the separation of the agglomerates easy. Consequently, in the second classification step (separation step), the separation means is not particularly limited as long as it can separate agglomerates, particularly unsteady agglomerates effectively.

The conventional third classification step is carried out immediately before obtaining the water-absorbing resin powder as a final product in most cases and is not carried out before the conveying step. From this point too, it is apparent that the conventional third classification step is completely different from the second classification step (separation step) of the present invention.

The difference of the second classification step (separation step) of the present invention from the conventional third classification step will be described in more detail. Comparing the size of the agglomerates to be removed in the second classification step (separation step) and the size of the water-absorbing resin powder, a final product, the size of the agglomerates is bigger. Consequently, in the second classification step (separation step), a sieve with relatively the biggest meshes is used. For example, in an embodiment of the present invention, the agglomerates are separated by using a sieve with meshes of 10 mm. In the following explanation, a "sieve with meshes of 10 mm" is sometimes referred to simply as a "sieve of 10 mm". A sieve to be used for the second classification step (separation step) may be any of a mesh sieve, a plate sieve (e.g., punched metal and the like), and a lattice as long as it can classify or separate the agglomerates and the form of the holes is not limited to be circle, rectangular or square and the like, and these sieves are called as "sieve" in the present invention. This is the same in the first classification step and the arbitrarily provided third classification step.

In the present invention, those left on the sieve of 10 mm (a substance not passed) in the classification of the second classification step (separation step) are defined as agglomerates. In this case, the agglomerates are 10 mm or bigger and supposed to be substantially the unsteady agglomerates. Additionally, if the quantity of the agglomerates is very small, the agglomerates may be discarded as they are. The substance sieved by the sieve of 10 mm (a substance passed) is not called as agglomerates. On the other hand, in the third classification step for obtaining the water-absorbing resin product, classification is carried out with, for example, a sieve of 0.85 mm.

As described above, the classification carried out in the second classification step (separation step) aims to separate agglomerates, particularly unsteady agglomerates. A separation method in the second classification step (separation step) is preferably classification by a sieve as described above. The separation method is not particularly limited as long as it is a method capable of efficiently separating the agglomerates.

In the present invention, the second classification step after the water addition is indispensable. If the agglomerates formed after water addition are not separated immediately after their formation, the agglomerates are gathered together and solidified to clog the production line before conveyed to the third classification step for obtaining a final product. In addition, the conveying is overloaded and the physical properties of the water-absorbing resin powder are deteriorated. In order to avoid clogging of the production equipment by the agglomerates, it is required to quickly remove the agglomerates immediately after their formation.

(Production Amount (Treatment Amount))

The above-mentioned effect is significant in a large scale production of a certain quantity or more per line, particularly in continuous production. The "large scale production" means, for example, continuous production with a production amount per line of preferably 300 [kg/hr] or more, more preferably 500 [kg/hr] or more, and still more preferably 1000 [kg/hr] or more. The effect of improving the physical properties of the water-absorbing resin powder is significant in the continuous production process, particularly, in the production involving the cooling step. In large scale production, there are various causes for decrease of fluidity in accordance with the form or the like of the water-absorbing resin powder, clogging and the like, and deterioration of physical properties and in the present invention, the above-mentioned effect is supposedly attributed to avoidance of these causes.

The upper limit of the production amount is not particularly limited; however, if the scale is too large, it becomes difficult to control the production or the physical properties may possibly be deteriorated. Consequently, the upper limit of the production amount is preferably about 10000 [kg/hr] since such problems are not caused.

The water-absorbing resin powder of the present invention is classified before surface-crosslinking or after surface-crosslinking, particularly by sieving. A sieving classification method of the water-absorbing resin powder is disclosed in, for example, U.S. Pat. No. 6,164,455 and International Publication Nos. 2006/074816, 2008/03672, 2008/037673, 2008/03675, and 2008/123477.

From the viewpoint of the effect of the present invention, preferable one among them is a classifying apparatus in which a sieving mesh face is spirally moved by combining radial tilt (tilt of sieving mesh for dispersing a material from the center to the periphery) and tangential tilt (tilt of sieving mesh for controlling the discharge speed on the mesh) like swinging type ones (Tumbler-Screen machines).

As described above, in the second classification step (separation step), lumps of the water-absorbing resin with a specified size or large (over) are first removed by a sieve with large meshes and the water-absorbing resin particles that passed through the sieve are classified by a sieve with smaller meshes to remove particles of the water-absorbing resin with a specified size or smaller (below) and obtain the water-absorbing resin powder with controlled particle size and remaining on the second sieve. In the second classification step (separation step), the used sieve size (mesh angle) is not particularly limited since it depends on the size of the intended water-absorbing resin powder.

(Joining of Surface-Crosslinking Step with Water Addition Step or Cooling Step)

The present invention characteristically involves the classification step (second classification step) after addition of water in the surface-crosslinking step and cooling step and the like and before mechanical conveying, particularly air conveying (substantial conveying).

The "before substantial conveying" means a state that there is no conveying step before the second classification step (excluding conveying of the water-absorbing resin due to gravitational falling, also called as mechanical conveying); particularly a state that there is no air conveying step, or the second classification step is directly joined immediately after the surface-crosslinking step; further a state that the conveying step before the second classification step after the surface-crosslinking is shorter than the conveying step after the second classification step; particularly a state that the conveying distance in the conveying step before the second classification step is ⅕ or less, further ¹/₁₀ or less, and particularly ¹/₅₀ or less of the conveying distance (m) in the conveying step after the second classification step. In the case that the second classification step is provided at the lower part of the surface-crosslinking step and furthermore in the state that there is no conveying step (also called as mechanical conveying) before the second classification step, that is, before substantial conveying, the water-absorbing resin powder is preferably conveyed from the surface-crosslinking step to the second classification step by gravitational falling.

In the present invention, at the time of conveying of the water-absorbing resin powder by dropping, continuous discharge in the previous step (e.g., various kinds of quantitative feeders to be used in the water addition step and the cooling step for discharge out of a mixing apparatus or for other necessity) can be used. In this case, the water-absorbing resin powder to be discharged quantitatively out of the heating treatment apparatus (particularly, the continuous heating treatment apparatus or the mixing apparatus) is preferably conveyed (dropped) to the second classification step provided at the lower part of the apparatus. As long as the water-absorbing resin is conveyed from an upper part to a lower part by gravitational dropping using a quantitative feeder to be used for continuous discharge or other necessity in the previous step, it is not included in the "mechanical conveying".

Consequently, the present invention further includes a conveying step (preferably air conveying and preferably conveying in perpendicular direction) after the water-absorbing resin powder is dropped to the second classification step set in a lower part for the water-absorbing resin powder to which water is added after surface-crosslinking.

In the present invention, "joining (to the cooling step)" is that a classification apparatus is installed in a lower part (in a downward direction) of the outlet of the cooling apparatus or mixing apparatus to which water is added and it produces a state that the water-absorbing resin powder is transferred from the mixing apparatus to the classification apparatus owing to the gravity without substantially using a conveying apparatus (particularly air conveying). The water addition in the present invention is not limited to the cooling step and may include water addition before surface-crosslinking, and for convenience, the case of adding water to the cooling step will be described below.

More specifically, the "joining" means connection of the discharge outlet of an equipment to be used in the step of adding water with the supply inlet of an equipment to be used in the second classification step only with a needed pipe for connection without using a special conveying means. In the case the step of adding water and the second classification step are joined, above mentioned periodical shielding may be inserted between both the steps. That is, connection may be formed without providing a conveying means between the step of adding water and the periodical shielding and/or between the periodical shielding and the second classification step (separation step).

The "lower part" is not limited to immediately below and may mean slantingly under as long as the water-absorbing resin powder is dropped and conveyed to the second classification step (separation step) and in this case, the connection may be formed with a slope or a curved pipe. The positioning relation between the outlet of the cooling apparatus and the classification apparatus is preferably within 45°, more preferably within 30°, still more preferably within 10°, and particularly preferably substantially 0° (immediately below) to a perpendicular line.

The distance between the outlet of the mixing apparatus or the cooling apparatus to which water is added and the inlet of the classification apparatus may be set properly and it is preferably 0 to 20 m, more preferably 0 to 10 m, still more preferably 0 to 5 m, particularly preferably 0 to 1 m, and most preferably substantially 0 m. The state that the distance between the outlet of the cooling apparatus and the inlet of the classification apparatus is substantially 0 m is referred to as "direct connection". The conveying time (the conveying time due to free fall and sliding down) is preferably within 5 minutes, more preferably within 1 minute, still more preferably within 0.5 minutes, and particularly preferably within 0.1 minutes and a shorter time is more preferable.

Since the water-absorbing resin powder is conveyed after the agglomerates of the water-absorbing resin powder, particularly unsteady agglomerates are removed in the second classification step by providing, after water addition, the second classification step (e.g., the supply inlet of the sieve) at the lower part of the step of water addition (e.g., the discharge outlet of the cooling apparatus or the like to be used in the step of adding water), the water-absorbing resin powder can be conveyed consequently in mild condition without applying an excess load on the conveying, particularly, the powder can be conveyed by air conveying and it results in suppression of deterioration of physical properties after surface-crosslinking. Furthermore, irregularly happening clogging or stopping in the conveying step can be avoided.

A preferable embodiment of the present invention sequentially involves the surface-crosslinking step, the water addition step (capable of also functioning as a cooling step), the second classification step, and the conveying step after the second classification step, and the respective apparatuses for the surface-crosslinking step, the water addition step, and the second classification step are joined to the lower part of the apparatuses for the previous steps and thus the water-absorbing resin powder is gravitationally conveyed between the steps. Further preferably, also in the humidifying and mixing step and the heating treatment step in the surface-crosslinking step, the respective apparatuses are joined to the lower part of the apparatuses for the previous steps and the water-absorbing resin powder is conveyed by gravitational falling. By employing the above-mentioned embodiment, apparatuses can be simplified, deterioration of the physical properties of the water-absorbing resin powder can be suppressed, and any trouble such as stopping of the operation can be avoided.

(Separation of Unsteady Agglomerates)

The inventors of the present invention have found that agglomerates formed by water addition when a production apparatus is operated for a long time, that is, agglomerates deposited in a production apparatus for a long time, particularly unsteady agglomerates, cause deterioration of the physical properties (deterioration of the standard deviation) of the water-absorbing resin powder to be obtained and stop the operation and that the above-mentioned problems can be solved by providing a separation step (second classification step) of the unsteady agglomerates immediately after water addition and these findings have led to completion of the present invention.

The maximum meshes of a sieve to be used in the second classification step is preferably 2 to 200 times, more preferably 3 to 100 times, still more preferably 5 to 50 times, and particularly preferably 10 to 30 times relative to the intended maximum particle size obtained by classification in the first classification step and/or the arbitrarily carried out third classification step. Concretely, in the first classification step, the particle diameter of the water-absorbing resin particles is controlled to be less than 1 mm, preferably less than 0.85 mm, and more preferably less than 0.71 mm and on the other hand, in the second classification step, agglomerates, particularly unsteady agglomerates having a particle diameter of 10 mm or more, preferably 20 mm or more are removed. The "intended maximum particle size" means the maximum size of the water-absorbing resin powder which pass through a sieve. The water-absorbing resin particles of less than 1 mm in the first classification step mean those which pass through the meshes (mesh square) of 1 mm of a sieve and the agglomerates of 10 mm or more in the second classification step mean those which do not pass through 10 mm of mesh square.

In the second classification step of the present invention, various kinds of classification apparatuses with the same design as those for the first classification step can be used and from the viewpoint of the classification efficiency and improvement of physical properties, sieving classification is preferably employed and electricity removed sieving classification is more preferably employed. In the second classification step, beside the classification and separation of the unsteady agglomerates, water-absorbing resin fine particles smaller than a given size can also be classified and separated.

In the case the step of removing the water-absorbing resin fine particles is included, only the water-absorbing resin powder within a specified range is selected by the second classification step. On the other hand, the separation step is a step of removing a portion of the water-absorbing resin powder which has a specified size or larger (over) as unsteady agglomerates and the like from the water-absorbing resin powder. Since the second classification step is also a step of carrying out at least separation (separation step), the explanation of the second classification step in the present invention is also the explanation of the separation step for removal of the agglomerates. The explanation of the separation step also describes the part for removing the agglomerates in the second classification step. In the second classification step, only separation of the unsteady agglomerates may be carried out.

(Recycling of Agglomerates)

The agglomerates, particularly unsteady agglomerates separated in the second classification step (separation step) are properly recovered and may be supplied again to the pulverization step before the surface-crosslinking step, or in the case moisture content is high, to the drying step before the pulverization step. In consideration of the cost for recovering the separated agglomerates and production efficiency and the like, it is desirable to determine the necessity of the execution. Concretely, in the case the recovery amount of the agglomerates is very small and it costs much, it is better to discard the agglomerates.

In the case the separated agglomerates are supplied again to the drying step, the agglomerates may be supplied to the drying step in the process for producing a water-absorbing resin powder of the present invention or to another drying apparatus independent of the production process. Which recovery method should be selected may be properly determined from the viewpoint of the cost and the production efficiency. The independent drying apparatus may have the same form as a common drying apparatus or a different form and may be selected properly in accordance with the condition of the agglomerates. In the case drying is carried out with an independent drying apparatus, the obtained dried product is properly adjusted to have a prescribed size in a pulverization step or the like.

In the case the separated agglomerates are supplied again to the pulverization step, the agglomerates may be supplied to the pulverization step in the process for producing a water-absorbing resin powder of the present invention or to another pulverizing apparatus independent of the production process. Which recovery method should be selected may be properly determined from the viewpoint of the cost and the production efficiency and the like. The independent pulverizing apparatus may have the same form as a common pulverizing apparatus or a different form and may be selected properly in accordance with the condition of the agglomerates. In the case pulverizing is carried out with an independent pulverizing apparatus, the obtained pulverized product is properly adjusted to have a prescribed size (e.g. less than 850 μm) in a classification step or the like. The pulverized substance out of a prescribed range may be pulverized again or discarded if the amount is small. The pulverized product obtained through the above-mentioned operation is sent to the surface-crosslinking step. The water-absorbing resin powder with excellent physical properties can be obtained efficiently by carrying out the above-mentioned operation.

As described above, separation of agglomerates formed by adding water makes it possible to avoid various troubles and furthermore to efficiently obtain a high quality water-absorbing resin powder as a final product without contamination of the water-absorbing resin powder with agglomerates.

(2-8) Conveying Step

In the process for producing a water-absorbing resin powder of the present invention, the water-absorbing resin powder after the surface-crosslinking step or after the second classification step (separation step) is conveyed to the next step such as a packaging step. Herein, in the conveying step after the surface-crosslinking step or after the second classification step, particularly in the conveying step after the second classification step, the proceeding direction is not particularly limited and may be properly selected from a transverse direction (horizontal direction), an upward slanting direction, a downward slanting direction, a downward direction, an upward direction (perpendicular direction), and the like. In the conveying section, a plurality of (preferably about 2 to 20) apparatuses and a plurality of (preferably about 2 to 5) curved parts or bent parts may exist. From the viewpoint of the effects of the present invention, it is preferable to include conveying (conveying in the perpendicular direction) of the water-absorbing resin powder from the lower side to the upper side at least after the second classification step. "Conveying in the perpendicular direction" means conveying from a first floor of a production plant to an upper floor (e.g., second to fourth floors and the like) or conveying to an apparatus in the next step installed in an upper part than the classification apparatus used for the second classification step. In this case, the conveying distance is within the following range and if the conveying distance is too long, the physical properties of the water-absorbing resin powder tend to be deteriorated and the fine particles tend to be increased and if the conveying distance is too short, the effects of the present invention are hard to be caused. Furthermore, to keep the mechanical load low, the number of curved parts in an air conveying pipe is preferably as small as possible and it is more preferably less than 6, still more preferably less than 5, particularly preferably less than 4, and most preferably less than 3.

A conveying method is not particularly limited and may be a method of using a mechanical conveying apparatus, for example, a screw feeder, a belt conveyer, a bucket conveyer, a flight conveyer, a vibration feeder, or air conveying and the like, and preferably air conveying. Air conveying disclosed, for example, in JP-A-2004-345804, International Publication Nos. 2007/104657, 2007/104673, and 2007/104676 can be employed for the air conveying.

Air to be used for the air conveying is preferably dried air for the primary air and secondary air from the viewpoint of physical property stability of the water-absorbing resin powder and suppression of clogging of the pipe or the like. The dew point of the dried air is preferably −30° C. or lower, more preferably −35° C. or lower, and still more preferably −40° C. or lower. Besides the dried air, heated air may be used. In this case, a heating method is not particularly limited and air may be directly heated using a heat source or the pipe in the conveying step may be heated to indirectly heat air flowing therein. The temperature of the heated air is preferably 30° C. or higher, more preferably 50° C. or higher, and still more preferably 70° C. or higher.

In the present invention, the temperature of the water-absorbing resin powder to be conveyed by air conveying is preferably 30° C. or higher, more preferably 40° C. or higher, and still more preferably 50° C. or higher. The physical property deterioration of the water-absorbing resin powder can be suppressed by keeping the temperature in the above-mentioned range. Concretely, a significant effect is caused on retention of the physical properties such as SFC (saline flow conductivity). From the above-mentioned viewpoint, the temperature of the water-absorbing resin powder to be supplied to a pipe for air conveying is preferably 100° C. or lower, more preferably 95° C. or lower, and still more preferably 90° C. or lower. The temperature of the water-absorbing resin powder near the outlet of the air conveying pipe is preferably 30° C. or higher, more preferably 40° C. or higher, and still more preferably 50° C. or higher.

The distance of the air conveying is not particularly limited and the total distance from the second classification step is preferably 5 m or longer, more preferably 10 to 1000 m and still more preferably 20 to 50 m. The diameter of a tube or the like to be used for the conveying step such as the air conveying is not particularly limited and preferably 3 to 30 cm and more preferably 5 to 20 cm. Furthermore, the final step is generally a packaging step to a bag, a conveying tank, a container or the like and before the step, a third classification step, a particle size adjustment step, a granulation step, and the like may be optionally added.

In the present invention, since the unsteady agglomerates formed by water addition are classified and separated in the second classification step (separation step), conveying is carried out well without applying a load to the conveying. Therefore, the physical property deterioration of the water-absorbing resin powder in the conveying step can be prevented.

(2-9) Other Steps

Besides the above-mentioned steps, if necessary, a recycling step of an evaporated monomer, a granulation step, a fine powder removal step, a fine powder recycling step, and the like may be added. Further, in order to cause an effect of stabilizing color with the lapse of time or to prevent gel deterioration and the like, the following additives may be used for a monomer or a polymer thereof. Prior to the packaging treatment, the water-absorbing resin particles may be treated in an arbitrary step and for example, a drying step for adjusting the moisture content, a particle size adjustment step for adjusting the particle size, a granulation step, and a classification step and the like may be arbitrarily added.

(Third Classification Step)

In the present invention, a third classification step is preferably further added after the conveying step. In the present invention, since the agglomerates are previously removed by providing the second classification step, the particle size control is made easier by the third classification step. If the water-absorbing resin powder from which the agglomerates have been removed in the second classification step is supplied to the third classification step as disclosed in the present invention, decrease of the classification efficiency because of coarsening of the agglomerates due to conveying and the like or the clogging of the classification means (e.g., a sieve) with the agglomerates can be prevented as compared with those in a conventional case of classification of the water-absorbing resin powder mixed with the agglomerates (particularly unsteady agglomerates) in the third classification step after the conveying step and also a problem of lowering of the productivity due to increase of the amount of the water-absorbing resin adhered to the agglomerates on a sieve can be avoided.

For example, as a classification means for the third classification step, above mentioned sieve may be employed. The maximum meshes of the sieve are not particularly limited and a sieve with meshes proper for removing the water-absorbing resin particles with a prescribed size or larger may be employed depending on the particle size of water-absorbing resin to be manufactured. The meshes are preferably in a range as described in the separation of the unsteady agglomerates.

Electricity is removed also in the third classification step to cause the same electricity removal effect as described above.

(Other Additives)

Further, in accordance with the purpose, 0 to 3 mass % and preferably 0 to 1 mass % of an oxidizing agent, an antioxidant, water, a polyvalent metal compound, a water-insoluble inorganic or organic powder such as silica and metal soap, etc., as well as a deodorant, an antibacterial agent, a polymer polyamine, pulp, and thermoplastic fibers, etc. may be added to the water-absorbing resin.

[3] Physical Properties of Water-Absorbing Resin Powder

In the case the purpose is to use the water-absorbing resin powder of the present invention for a sanitary material, particularly a paper diaper, it is preferable to control at least one of the following (3-1) to (3-6), further two or more including AAP, and particularly three or more by the above-mentioned polymerization and surface-crosslinking. In the case the followings are not satisfied, the water-absorbing resin powder sometimes fails to exhibit sufficient function in form of a high concentration diaper described below. The production method of the present invention is more effective for producing a water-absorbing resin attaining the following physical properties of the water-absorbing resin.

(3-1) Water Absorption Against Pressure (AAP)

In order to prevent leakage in a paper diaper, the water absorption against pressure (AAP) for an aqueous 0.9 wt. % sodium chloride aqueous solution under a pressure of 2.06 kPa (21 [g/cm$^2$]) and that of 4.83 kPa (49 [g/cm$^2$]) is controlled to be preferably 20 [g/g] or higher, more preferably 22 [g/g] or higher, and still more preferably 24 [g/g] or higher. The AAP is more preferable as it is higher; however, from the viewpoint of the balance between other physical properties and cost, the upper limit of the AAP is about 40 [g/g] at 2.06 kPa (21 [g/cm$^2$]) and about 30 [g/g] at 4.83 kPa (49 [g/cm$^2$]). The AAP is shown as a value at 4.83 kPa (49 [g/cm$^2$]) unless otherwise specified. The standard deviation which indicates the physical properties stability in continuous production is stable as 0.3 or less, 0.2 or less, particularly 0.1 or less.

(3-2) Liquid Permeability (SFC)

In some cases, in order to prevent a leakage from a paper diaper, the liquid permeability under pressure, which is a flow conductivity SFC (defined in U.S. Pat. No. 5,669,894) to a 0.69% physiological saline flow conductivity (SFC) is controlled to be 1 [×10$^{-7}$·cm$^3$·s·g$^{-1}$] or higher, preferably 25 [×10$^{-7}$·cm$^3$·s·g$^{-1}$] or higher, more preferably 50 [×10$^{-7}$·cm$^3$·s·g$^{-1}$] or higher, still more preferably 70 [×10$^{-7}$·cm$^3$·s·g$^{-1}$] or higher, and particularly preferably 100 [×10$^{-7}$·cm$^3$·s·g$^{-1}$] or higher.

In order to more effectively improve the liquid permeability, especially to improve SFC to 25 [×10$^{-7}$·cm$^3$·s·g$^{-1}$] or higher, the present invention is preferably applied for producing a water-absorbing resin with high liquid permeability.

(3-3) Water Absorption Capacity without Load (CRC)

Water absorption capacity without load (CRC) is controlled to be preferably 10 [g/g] or higher, more preferably 20 [g/g] or higher, still more preferably 25 [g/g] or higher, and particularly preferably 30 [g/g] or higher. The CRC is more preferable as it is higher, and the upper limit is not particularly limited; however, from the viewpoint of balance with other physical properties, it is preferably 50 [g/g] or lower, more preferably 45 [g/g] or lower, and still more preferably 40 [g/g] or lower.

(3-4) Extractables (Dissolve Amount)

The amount of extractables is preferably 0 to 35 wt. % or lower, more preferably 25 wt. % or lower, still more preferably 15 wt. % or lower, and particularly preferably 10 wt. % or lower.

(3-5) Residual Monomer

Using the above-mentioned polymerization as one example of achieving means, the amount of the residual monomer is adjusted to be generally 500 ppm or lower, preferably 0 to 400 ppm, more preferably 0 to 300 ppm, and particularly preferably 0 to 200 ppm.

(3-6) Moisture Content

As described above, the water-absorbing resin powder obtained by adding water may be dried further; however, it is preferable to leave a given amount of water from the viewpoint of water absorption speed, impact stability of the powder, and powdering suppression. The moisture content (defined in ERT 420.02-02) of the water-absorbing resin powder is preferably 0.2 wt. % or more, more preferably 1 to 15 wt. %, still more preferably 2 to 10 wt. %, and particularly preferably 3 to 8 wt. %.

If the moisture content is low, the water-absorbing resin powder tends to be inferior in water absorption speed, impact stability of the powder, and powdering suppression and if the moisture content is too high, the water-absorbing resin powder tends to be inferior in the water absorption capacity and powder fluidity. Since the water-absorbing resin after the surface-crosslinking, particularly, the water-absorbing resin after the surface-crosslinking by a dehydration reactive crosslinking agent and the like, has a low moisture content, moisture content improvement by water addition after the surface-crosslinking in the present invention is preferably usable.

EXAMPLES

The present invention will be described below in more detail by reference to Examples. However, the present invention is not limited to these Examples. In addition, "liter" may be represented as "L", and "% by weight" may be represented as "wt %", for convenience. In this connection, all the electrical equipments to be used in Examples and Comparative Examples were used at 200 V or 100 V, unless otherwise indicated. Further, various physical properties of the water-absorbing resin of the present invention were measured under the conditions of a room temperature (20° C. to 25° C.) and a humidity of 50 RH %, unless otherwise indicated.

[Measurement Methods of Physical Properties]
[Moisture Content of Agglomerates]

Moisture content of agglomerates was measured. That is, about 1 g of agglomerates was thinly spread by breaking it up and the like if necessary on an aluminum plate having a base diameter of about 5 cm, was dried in a windless oven at 180° C. for 3 hours, and then weighed. The weights before and after the drying were substituted into the following formula 1 (reprinted) to determine the moisture content (% by mass). In this connection, wt0 stands for the weight of agglomerates before the drying and wt1 stands for the weight of agglomerates after the drying.

Moisture content [wt. %]= (wt0−wt1)/wt0×100    [Mathematical Formula 1]

[CRC]

The measurements were carried out according to ERT441.2-02.

[AAP]

The measurements were carried out according to ERT442.2-02. In this connection, the measurements in the present invention and Examples were carried out under the load condition to 4.83 kPa.

Example 1

Production of Water-Absorbing Resin Powder to be Subjected to Surface-Crosslinking Treatment (Polymerization Step)

After 0.14 [g/mol] of sodium persulfate and 0.005 [g/mol] of L-ascorbic acid were separately and continuously mixed by line mixing with an aqueous solution (an aqueous monomer solution (1)) of partially neutralized acrylic acid sodium salt containing 0.04 mol % (on the basis of monomer) of polyethylene glycol diacrylate (average number of moles n of ethylene oxide added=9) as an internal crosslinking agent, having a neutralization ratio of the acid group of 75 mol %, and a monomer concentration of 38 wt. %, the mixture was continuously supplied to a horizontal steel belt polymerizer and continuously subjected to static aqueous solution polymerization (belt retention time: about 30 minutes, thickness on the belt: about 25 mm) to obtain a water-containing gel-like crosslinked polymer (1a).

(Gel-Crushing Step, Drying Step, and Pulverization Step)

The obtained water-containing gel-like crosslinked polymer (1a) was gel-crushed into a fine granular state of several millimeters in size by a meat chopper and the resulting polymer was thinly spread on a porous plate of a band drier and continuously dried by hot air at 160 to 180° C. for 30 minutes to obtain a block-like dried polymer (1b) at the outlet of the drier. The dried polymer (1b) was crushed as soon as being taken out and the obtained granular dried product (1c) was continuously supplied at 1650 [kg/hr] to a three-stage roll granulator and pulverized to obtain a pulverzied material (1d).

(First Classification Step)

As a first classification step, the obtained pulverzied material (1d) at about 60° C. was classified by a shaking type circular sieving apparatus having a standard sieve with meshes of 850 μm and treated for electricity removal to 5Ω or lower to obtain water-absorbing resin particles (1e) of which 90 wt. % had a particle diameter of not 150 μm or more and less than 850 μm. The stand on which the sieving apparatus was arranged was also treated for electricity removal and earthed to have an earth resistance of 5Ω. The water absorption capacity without load (CRC) of the obtained water-absorbing resin particles (1e) was 44 [g/g], the amount of water extractables (Ext) was 16 wt. %, and the weight average particle diameter (D50) was 400 μm.

(Surface-Crosslinking Step)
(Humidifying and Mixing Step)

Next, the water-absorbing resin particles (1e) obtained in the above-mentioned step were continuously supplied at 1500 [kg/hr] to a high speed continuous mixing apparatus (Turbulizer manufactured by Hosokawa Micron Ltd./1000 rpm) and an aqueous surface-crosslinking agent solution containing 1,4-butanediol/propylene glycol/water=0.4 parts by weight/0.6 parts by weight/3.5 parts by weight relative to 100 parts by weight of the water-absorbing resin particles (1e) was sprayed to form droplets with an average particle diameter of about 200 μm by a spray and mixed (water addition at the time of surface-crosslinking).

(Heat Treatment Step)

Next, the obtained humidified mixture was continuously heated treatment at 195° C. for 50 minutes by a paddle type low speed stirring type indirect heating drying apparatus (paddle drier) installed under the high speed continuous mixing apparatus to obtain a water-absorbing resin powder (1f). The specification and the like of the paddle type low speed stirring type indirect heating drying apparatus (paddle drier) was as follows. The drying apparatus was a transverse type continuous stirring apparatus (1) equipped with 2 rotary shafts and having a downward tilting angle of 1°, an aspect ratio of 2.2, a paddle rotation speed of 13 rpm, scraping blades, and an inner surface roughness (Rz) of 500 nm and in this case, the inside of the apparatus (1) was sucked by a suction discharge apparatus having a bag filter to reduce the pressure in the apparatus to 1 kPa. The total surface area of the stirring blades and stirring shafts was 24.4 m$^2$ and the mass surface area ratio calculated from the surface area and treatment amount was 61.5 [kg/m$^2$/hr]. The stirring power at the time of the surface treatment was 27.8 kW, the stirring power in idling was 13.5 kW, the average retention time was 45 minutes, and the stirring power index was 9.5 [W·hr/kg].

(Cooling Step and Water Addition Step)

The water-absorbing resin powder (1f) obtained in the above-mentioned step was cooled by circulating a refrigerant (cold water) at 40° C. to a paddle drier connected in series to a lower part of the heating drying apparatus with the same specification as that of the paddle drier used for the heating treatment. At this time, suctioning air current was slightly led to an upper space of the cooling apparatus to reduce the inside pressure to 100 mmH2O. When the temperature at a position of ⅓ length from the outlet side in the whole length of the cooling apparatus was measured, it was found to be 65° C., and therefore, 2 wt. % (on the basis of the water-absorbing resin powder (1f)) of water was sprayed and added from an upper side of the position by a two-fluid nozzle manufactured by Spraying Systems Japan (Air Atomizing Nozzle SUF 1, flat pattern) to obtain a water-absorbing resin powder (1g).

(Second Classification Step)

Then, the water-absorbing resin powder (1g) to which water was added was dropped spontaneously to and classified by a shaking type circular sieving apparatus having a standard sieve with meshes of 10 mm directly joined to the lower part of the outlet of the cooling apparatus (immediately under the cooling apparatus at a distance of 0.5 m) (second classification step, electricity removal was done similarly to that in the first classification step). Agglomerates were deposited on the standard sieve with meshes of 10 mm due to the operation for a long time although the amount was a level of causing no problem on the operation. The agglomerates were mainly agglomerates separated from the inner wall surface of the cooling apparatus and generated unsteadily. The moisture content of the agglomerates was 12 wt. %.

(Conveying Step and Third Classification Step)

The water-absorbing resin powder (1h) passed through the standard sieve with meshes of 10 mm in the second classification step was conveyed by air conveying including conveying in the perpendicular and upward direction by compressed air with a dew point of −20° C. and classified with a standard sieve with meshes of 850 μm in the third classification step, which is the final step, to obtain a water-absorbing resin powder (1i) of the present invention. The water absorption capacity without load (CRC) of the obtained water-absorbing resin powder (1i) was 34 [g/g] and the water absorption against pressure of 4.83 kPa (AAP) was 23 [g/g].

Example 2

The same operation as in Example 1 was carried out except that the water supply amount in the cooling step was changed to be 0.5 wt. %. Substances which did not pass through the standard sieve with meshes of 10 mm in the second classification were deposited to form agglomerates due to the operation for a long time. The moisture content of the agglomerates was 6 wt. %. On the other hand, the substances that passed through the standard sieve with meshes of 10 mm were transferred to the third classification step, the final step, and classified by a standard sieve with meshes of 850 μm to obtain a water-absorbing resin powder (2i) of the present invention. The water absorption capacity without load (CRC) of the obtained water-absorbing resin powder (2i) was 35 [g/g] and the water absorption against pressure of 4.83 kPa (AAP) was 24 [g/g].

Comparative Example 1

The same operation as in Example 1 was carried out except that the second classification step provided in the lower part of the cooling apparatus was removed (the second classification step was not carried out). That is, in Example 1, without installing a shaking type circular sieving apparatus having a standard sieve with meshes of 10 mm and joined directly to the lower part of the outlet of the cooling apparatus, water was added in the cooling step. At the beginning of the operation, the production smoothly proceeded in the same manner as in Example 1; however, when continuous operation was continued for a long time, the physical properties were gradually lowered (the standard deviation was deteriorated). It was made apparent that the reason for that was attributed to the agglomerates of the water-absorbing resin deposited on the inner surface of the mixing apparatus by water addition.

The volume of the agglomerates was increased in the mixing apparatus and the agglomerates were separated in form of unsteady moisture-containing agglomerates of the water-absorbing resin (about 10 to 80 mm) from the inner surface of the mixing apparatus and clogged the outlet of the cooling apparatus and also clogged the conveying apparatus. Due to the clogging of the outlet, the water-absorbing resin to which water was added was not discharged and it was made impossible to continue the operation. The results are shown in Table 1.

Comparative Example 2

The same operation as in Example 2 was carried out except that the second classification step provided in the lower part of the cooling apparatus was removed (the second classification step was not carried out). That is, in Example 2, without installing a shaking type circular sieving apparatus having a standard sieve with meshes of 10 mm and joined directly to the lower part of the outlet of the cooling apparatus, water was added in the cooling step. At the beginning of the operation, the production smoothly proceeded in the same manner as in Example 2; however, when continuous operation was continued for a long time, the physical properties were gradually lowered (the standard deviation was deteriorated). Further, the agglomerates grew in the cooling apparatus with the lapse of time and were occasionally dropped and discharged as large lumps and thus clogged the outlet to make it impossible to continue the operation. The results are shown in Table 1.

Comparative Example 3

In Comparative Example 1, the standard sieve of 10 mm used in the second classification step was further added to the third classification step (for passing through the standard sieve of 850 μm) to carry out two-stage classification by sieves of 10 mm and 850 μm in the third classification step (the second classification step was not carried out). The production smoothly proceeded without forming agglomerates at the beginning in the same manner as in Comparative Example 1; however, when operation was continued for a long time, unsteady agglomerates (about 10 to 50 mm) of the water-absorbing resin were separated from the inner surface of the mixing apparatus and caused clogging. The results are shown in Table 1.

Comparative Example 4

In Example 1, the sieve for the second classification step was positioned in an upper part of the cooling apparatus and the water-absorbing resin powder discharged out of the cooling step was sent to the sieve for the second classification step by air conveying (conveying step). Further, the third classification step (for passing through the standard sieve of 850 μm) was further provided in the lower part. In the second classification step, during conveying, the production smoothly proceeded without forming agglomerates at the beginning in the same manner as in Comparative Example 1; however, when operation was continued for a long time, unsteady agglomerates (about 10 to 50 mm) of the water-absorbing resin were separated from the inner surface of the mixing apparatus and caused clogging. The results are shown in Table 1.

Comparative Example 5

In the water addition step in Example 1, ethanol was used in place of water as a solvent. No agglomeration was observed and there was no problem on the conveying; however, since water was not used, and furthermore, a fine powder was observed and physical property deterioration (about 0.5 [g/g] of AAP) was observed in the conveying step. The results are shown in Table 1.

Comparative Example 6

In Comparative Example 1, the conveying step after the water addition step was changed from air conveying to conveying by a bucket conveyer. Similarly to Comparative Example 1, the bucket conveyer was stopped because of operation for a long time. The results are shown in Table 1.

Comparative Example 7

In Comparative Example 1, the water addition step was carried out by changing the low speed stirring type mixing apparatus in the cooling step to a high speed stirring type mixing apparatus, Turbulizer, separately installed after the cooling step. Clogging was scarcely observed during operation for a long time. It can be understood that the characteristic of the present application can be largely exhibited by using the low speed rotating type mixing apparatus. The results are shown in Table 1.

Comparative Example 8

In Comparative Example 1, continuous operation was temporarily stopped for every 5 to 10 days to clean the inside of the mixing apparatus and semi-continuous operation was carried out. Although the frequency was decreased as compared with that in Comparative Example 1, clogging was observed and the productivity was further deteriorated.

Example 3

No electricity removal was carried out in the classification step in Example 1. That is, since the classification apparatus was fixed to a stand in a floating state from the viewpoint of earth and thus the static electricity and the like generated at the time of classification could not be released. In comparison with the results of Example 1, AAP was lowered by about 0.5 [g/g] and the standard deviation was increased by about 0.1 [g/g] (that is, deterioration of the physical property); however, no clogging occurred and there was no problem on continuous operation. The results are shown in Table 1.

Example 4

A rotor valve was installed in the outlet of the cooling apparatus to carry out periodic shielding in Example 1. In comparison with the results of Example 1, AAP was increased by about 0.5 [g/g] and the standard deviation was decreased by about 0.1 [g/g] (that is, improvement of the physical property); however, no clogging occurred and there was no problem on continuous operation. The results are shown in Table 1.

Example 5

In Example 1, the standard sieve of 10 mm used in the second classification step was further added to the third classification step (for passing through the standard sieve of 850 μm) to carry out two-stage classification by sieves of 10 mm and 850 μm in the third classification step. The results are shown in Table 1.

TABLE 1

| | Additive in cooling step [wt %] | Second classification step | | water-absorbing resin powder | | | Clogging |
| | | Installation position | Mesh [mm] | CRC [g/g] | AAP [g/g] | AAP standard deviation | interval [days] |
|---|---|---|---|---|---|---|---|
| Example 1 | Water 2 | lower part of the cooling apparatus 0.5 m immediately below | 10 | 34.0 | 23.0 | 0.2 | N/A[3] |
| Example 2 | Water 0.5 | Same as above | 10 | 35.0 | 22.0 | 0.2 | N/A[3] |
| Comparative Example 1 | Water 2 | Not installed | — | 34.0 | 23.0 | 0.4 | 10-20 |
| Comparative Example 2 | Water 0.5 | Not installed | — | 35.0 | 22.0 | 0.3 | 15-30 |
| Comparative Example 3 | Water 2 | Not installed[1] | — | 34.0 | 23.0 | 0.2 | 15-30 |
| Comparative Example 4 | Water 2 | upper part of the cooling apparatus[2] | 10 | 34.0 | 23.0 | 0.3 | 15-30 |
| Comparative Example 5 | Ethanol 2 | Not installed | — | 34.0 | 22.5 | 0.2 | N/A |
| Comparative Example 6 | Water 2 | Not installed | — | 34.0 | 23.0 | 0.4 | 15-30 |
| Comparative Example 7 | Water 2 | Not installed | — | 34.0 | 23.0 | 0.4 | 60-90 |
| Comparative Example 8 | Water 2 | Not installed | — | 34.0 | 23.0 | 0.3 | 60-90 |
| Example 3 | Water 2 | lower part of the cooling apparatus 0.5 m immediately below | 10 | 34.0 | 23.0 | 0.3 | N/A[3] |
| Example 4 | Water 2 | Same as above | 10 | 34.0 | 23.0 | 0.3 | N/A[3] |
| Example 5 | Water 2 | Same as above | 10 | 34.0 | 23.0 | 0.3 | N/A[3] |

[1]the standard sieve of 10 mm used in the second classification step was added to the third classification step
[2]the standard sieve of 850 μm to be used in the third classification step was provided in the lower part of the second classification step
[3]continuously operated 100 days or longer (Conclusion)

As shown in Table 1, in the production process of the present invention involving the second classification step in a lower part of the water addition step, stable operation is possible for a long time and physical properties are stabilized (decrease of standard deviation) or improved (improvement of AAP). The present invention solves the problem of a conventional technique (Comparative Examples), in other words, a problem that, although stable production is possible at the beginning of the operation, the physical properties are deteriorated with the lapse of time or operation is stopped when the operation is continued for a long time.

INDUSTRIAL APPLICABILITY

A water-absorbing resin powder mixed with or containing a given amount of water, scarcely bearing a fine powder, and having high physical properties can be produced with stable physical properties by continuous operation for a long time.

The invention claimed is:

1. A process for producing a water-absorbing resin powder, sequentially comprising:
   a first classification step for a water-absorbing resin,
   a surface-crosslinking step after the first classification step,
   a water addition step in which 0.01 to 50 parts by weight of a water-based liquid is added relative to 100 parts by weight of a water-absorbing resin powder in at least one stage of after surface-crosslinking, during surface-crosslinking, and before surface-crosslinking,
   a second classification step, where maximum meshes of a sieve to be used in the second classification step is 2 to 200 times relative to a maximum particle size obtained by the first classification step,
   a conveying step for conveying the water-absorbing resin powder after the second classification step, said conveying step comprises conveying the water-absorbing resin powder upward in a perpendicular direction, and where the conveying step is a mechanical conveying step using at least one mechanical conveying apparatus selected from the group consisting of a screw feeder, a belt conveyor, a bucket conveyor, a flight conveyor, a vibration feeder and an air conveying device,
   wherein a moisture content of the water-absorbing resin powder before the second classification step is 0.2 wt. % to 15 wt. %,
   a production amount per line of the water-absorbing resin powder is 300 kg/hr to 10,000 kg/hr, and
   where the process includes at least one of the following (1) to (3):
   (1) the second classification step classifies the water-absorbing resin powder at a lower part of the apparatus for the water addition step,
   (2) a state where there is no mechanical conveying step before the second classification step,
   (3) a state where the second classification step directly follows immediately after the water addition step.

2. The production process according to claim 1, wherein the second classification step is set before the conveying step and an apparatus to be used in the second classification step is joined at 0 to 20 m interval to a lower part of the apparatus for adding water in the water addition step.

3. The production process according to claim 1, wherein the water addition step is carried out for the water-absorbing resin powder after surface-crosslinking.

4. The production process according to claim 1, wherein the water addition step functions also as a cooling step after surface-crosslinking and an apparatus for adding water in the water addition step is a low speed stirring type cooling apparatus having a stirring rotary shaft with a rotation speed of less than 100 rpm.

5. The production process according to claim 1, wherein the surface-crosslinking step or the water addition step is conducted in a transverse type continuous stirring apparatus having a feeding inlet and a discharge outlet for the water-absorbing resin powder, a stirring means having one or more rotary shafts equipped with a plurality of stirring blades, and a heating or cooling means.

6. The production process according to claim 1, wherein water to be added in the water addition step contains an additive and the additive is one or more compounds selected from the group consisting of inorganic crosslinking agents, deodorants, antibacterial agents, coloring agents, chelating agents, inorganic salts, acids, alkalis, and surfactants.

7. The production process according to claim 1, further comprising a periodically shielding apparatus which is installed between an apparatus for adding water in the water addition step and an apparatus to be used in the second classification step.

8. The production process according to claim 1, further comprising electricity removal which is carried out in the first classification step and/or the second classification step.

9. The production process according to claim 1, wherein a third classification step is further set after the conveying step, and the third classification step is for controlling the particle size distribution of the water-absorbing resin powder by classification with a sieve.

10. The production process according to claim 1, further comprising a third classification step after the conveying step, and wherein the second classification step is carried out by a sieve having the maximum meshes of 2 to 200 times relative to the maximum particle size of the water-absorbing resin powder obtained in the third classification step.

11. The production process according to claim 1, wherein said water-absorbing resin powder has unsteady agglomerates with a particle diameter 10 mm or larger removed in the second classification step after obtaining water-absorbing resin particles with a particle diameter smaller than 1 mm in the first classification step.

12. The production process according to claim 11, wherein the unsteady agglomerates separated in the second classification step are crushed and then recycled to a step prior to the second classification step.

13. The production process according to claim 11, wherein the unsteady agglomerates separated in the second classification step are crushed and then subjected to surface-crosslinking.

14. The production process according to claim 1, wherein the conveying step is air conveying for a conveying distance of 10 to 1000 m.

15. The production process according to claim 1, wherein the water-absorbing resin powder has a moisture content of 1 to 15 wt. % and the water absorption capacity under load at 4.83 kPa is 20 [g/g] to 30 [g/g].

16. The production process according to claim 1, wherein the water-absorbing resin is crushed particles obtained by continuous kneader polymerization or continuous belt polymerization and the surface-crosslinking agent is a dehydration reactive surface-crosslinking agent.

17. The production process according to claim 1, wherein the water-absorbing resin to be supplied to the first classification step is obtained through a polymerization step, a gel-crushing step, a drying step, and a pulverization step.

18. The production process according to claim 1, wherein the conveying step after the surface-crosslinking step or the second classification step is a step of conveying the water-absorbing resin powder upward in the perpendicular direction by air conveying and a temperature of the water-absorbing resin powder to be conveyed by the air conveying is 30° C. to 100° C.

19. The production process according to claim 1, sequentially comprising the first classification step, the surface-crosslinking step, the water addition step, the second classification step, and the conveying step after the second classification step, wherein respective apparatuses for the surface-crosslinking step, the water addition step, and the second classification step are joined to lower parts of the apparatuses for the previous steps and the water-absorbing resin powder is gravitationally conveyed between the steps.

20. The production process according to claim 18, wherein air used in the air conveying is dried air having the dew point of −30° C. or lower.

* * * * *